United States Patent
Choudhury et al.

(10) Patent No.: US 12,401,803 B2
(45) Date of Patent: Aug. 26, 2025

(54) CROSS-ASSET GUIDED CHROMA REFORMATTING FOR MULTI-ASSET IMAGING FORMAT

(71) Applicant: Dolby Laboratories Licensing Corporation, San Francisco, CA (US)

(72) Inventors: Anustup Kumar Atanu Choudhury, Campbell, CA (US); Guan-Ming Su, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 65 days.

(21) Appl. No.: 18/460,377

(22) Filed: Sep. 1, 2023

(65) Prior Publication Data
US 2024/0114153 A1   Apr. 4, 2024

Related U.S. Application Data

(60) Provisional application No. 63/409,579, filed on Sep. 23, 2022.

(30) Foreign Application Priority Data

Jan. 15, 2023  (EP) .................................... 23151640

(51) Int. Cl.
H04N 7/12    (2006.01)
G06V 10/25   (2022.01)
(Continued)

(52) U.S. Cl.
CPC ........... H04N 19/184 (2014.11); G06V 10/25 (2022.01); H04N 19/117 (2014.11);
(Continued)

(58) Field of Classification Search
CPC .. H04N 19/184; H04N 19/117; H04N 19/172; H04N 19/59; H04N 19/98;
(Continued)

(56) References Cited

U.S. PATENT DOCUMENTS 7,868,950 B1   1/2011   Samadani
9,100,660 B2   8/2015   Su
(Continued)

FOREIGN PATENT DOCUMENTS

CN    112200719 A    1/2021
CN    113160039 A    7/2021
(Continued)

OTHER PUBLICATIONS

Caraffa, L. et al., "The Guided Bilateral Filter: When the Joint/Cross Bilateral Filter Becomes Robust," IEEE Transactions on Image Processing (2015), 24 (4), pp. 1199-1208.
(Continued)

*Primary Examiner* — Gims S Philippe

(57) ABSTRACT

A first image and a second image of different dynamic ranges are derived from the same source image. Based on a chroma sampling format of the first image, it is determined whether edge preserving filtering is to be used to generate chroma upsampled image data in a reconstructed image. If so, image metadata for performing the edge preserving filtering is generated. The first image, the second image and the image metadata are encoded into an image data container to enable a recipient device to generate the reconstructed image.

16 Claims, 7 Drawing Sheets

(51) Int. Cl.
*H04N 19/117* (2014.01)
*H04N 19/172* (2014.01)
*H04N 19/184* (2014.01)
*H04N 19/59* (2014.01)
*H04N 19/98* (2014.01)

(52) U.S. Cl.
CPC ........... *H04N 19/172* (2014.11); *H04N 19/59* (2014.11); *H04N 19/98* (2014.11)

(58) Field of Classification Search
CPC .... H04N 19/132; H04N 19/186; H04N 19/80; G06V 10/25; G06T 5/00; G06T 2207/20208; G06T 2207/30192
See application file for complete search history.

(56) References Cited

U.S. PATENT DOCUMENTS

| | | | |
|---|---|---|---|
| 9,344,639 | B2 | 5/2016 | Musatenko |
| 9,478,017 | B2 | 10/2016 | Vermeir |
| 9,510,016 | B2 * | 11/2016 | Gomila ................ H04N 19/102 |
| 9,743,100 | B2 | 8/2017 | Sato |
| 9,779,491 | B2 | 10/2017 | Tezaur |
| 10,477,251 | B2 | 11/2019 | Mukherjee |
| 10,552,876 | B2 | 2/2020 | Vermeir |
| 10,839,487 | B2 | 11/2020 | Stewart |
| 10,841,488 | B2 | 11/2020 | Jiang |
| 10,951,817 | B2 | 3/2021 | Kurihara |
| 2008/0036792 | A1 | 2/2008 | Liang |
| 2008/0199091 | A1 * | 8/2008 | Srinivasan ........... H04N 19/176 382/239 |
| 2011/0181778 | A1 | 7/2011 | Komaki |
| 2013/0064448 | A1 * | 3/2013 | Tomaselli ................ G06T 5/20 382/167 |
| 2014/0037206 | A1 * | 2/2014 | Newton ............... H04N 19/597 382/166 |
| 2018/0012440 | A1 | 1/2018 | Guerra |
| 2018/0352225 | A1 * | 12/2018 | Guo ..................... H04N 19/186 |
| 2019/0228253 | A1 | 7/2019 | Ramaswamy |
| 2019/0246087 | A1 | 8/2019 | Uesaka |
| 2019/0349581 | A1 * | 11/2019 | Fuchie ................ H04N 19/115 |
| 2021/0090301 | A1 | 3/2021 | Mammou |
| 2021/0400266 | A1 | 12/2021 | Du |
| 2022/0005228 | A1 | 1/2022 | Tourapis |
| 2022/0086472 | A1 | 3/2022 | Zhao |
| 2023/0027058 | A1 * | 1/2023 | Hannuksela ........... H04N 19/33 |
| 2023/0217017 | A1 * | 7/2023 | Hannuksela ........... H04N 19/96 375/240.12 |
| 2024/0007619 | A1 * | 1/2024 | Hannuksela ......... H04N 19/107 |

FOREIGN PATENT DOCUMENTS

| | | |
|---|---|---|
| CN | 109523458 B | 12/2022 |
| WO | 2022072884 A1 | 4/2022 |
| WO | 2023205548 A1 | 10/2023 |

OTHER PUBLICATIONS

Dong, Jie et al.; "Cross-Plane Chroma Enhancement for SHVC Inter-Layer Prediction"; 2013 Picture Coding Symposium (PCS); IEEE; Dec. 8, 2013; pp. 309-312.

He, K. et al."Guided Image Filtering" IEEE Transactions on Pattern Analysis and Machine Intelligence, vol. 35, No. 6, Jun. 2013, pp. 1397-1409, 13 pages.

ITU Rec. ITU-R BT 1886, "Reference electro-optical transfer function for flat panel displays used in HDTV studio production," (Mar. 2011). 7 pages.

ITU-R BT.2124-0 "Objective metric for the assessment of the potential visibility of colour differences in television" Jan. 2019.

SMPTE ST 2084: 2014 "High Dynamic Range Electro-Optical Transfer Function of Mastering Reference Displays" SMPTE Standard, 14 pages.

Vermeir, Thijs et al.; "Guided Chroma Reconstruction for Screen Content Coding"; IEEE Transactions on Circuits and Systems for Video Technology; IEEE; USA; vol. 26; No. 10; Oct. 1, 2016; pp. 1884-1892.

* cited by examiner

CROSS-ASSET GUIDED CHROMA REFORMATTING FOR MULTI-ASSET IMAGING FORMAT

CROSS-REFERENCE TO RELATED APPLICATIONS

This application claims priority from U.S. Provisional Application No. 63/409,579, filed 23 Sep. 2022, and European Application No. 23151640.2 filed on 15 Jan. 2023, each of which is incorporated by reference herein in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 $cd/m^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, *"Image parameter values for high dynamic range television for use in production and international programme exchange,"* (June 2017). As appreciated by the inventors here, improved techniques for generating high quality video content data with high dynamic range, high local contrast and vivid color are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
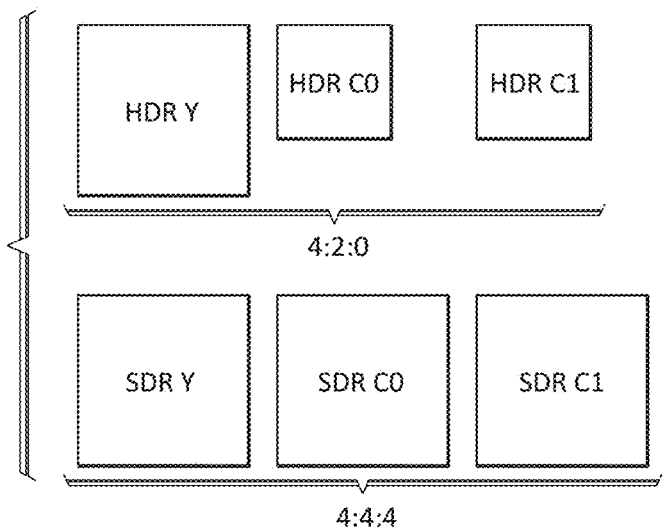
FIG. 1A and FIG. 1B illustrate example HDR and SDR images encoded in a multi-asset imaging format.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

Techniques as described herein can be used to implement a guided chroma reformatting framework in a multi-asset imaging system. The multi-asset imaging system refers to a system that encapsulates or multiplexes different grades of images or assets for the same real or artificial world scene in a multi-asset image format. These different grades or assets encapsulated in the same multi-asset image format may include, but are not necessarily limited to only, one or more of: an image/asset graded as an SDR image, an image/asset graded as a medium dynamic range (MDR) image, an image/asset graded as an HDR image, etc. The different grades of images/assets encapsulated in the same multi-asset image format provide flexibility for single or multiple end user devices to choose images/assets of specific or intended grades for decoding and playback.

Introduction

By way of example but not limitation, the multi-asset image format may be a hypothetical high-dynamic range imaging format, to be called for short Dolby Photo Format 0, which includes an image container that hosts, contains or is encoded with a first asset in the form of a JPEG SDR image. The multi-asset image format further includes an APP11 marker that contain or is encoded with a (non-host) HEVC HDR image. The APP11 marker represents an application segment separate from and/or attendant to the image container in which the host image or the JPEG SDR image is encoded. End user devices that do not recognize the Dolby Photo Format 0 or that do not have HEVC decoders can just show or render the host image or JPEG SDR image. On the other hand, end user devices such as Dolby photo compliant image devices that do recognize the multi-asset image format or the Dolby Photo Format 0 and have HEVC decoders can decode, display or render the HEVC HDR image received in the APP 11 marker of the multi-asset image format.

The hosted JPEG SDR image may be represented in any chroma sampling format such as 4:2:0, 4:2:2, and 4:4:4. A multi-asset imaging system and/or an end user device as described herein may support the (most popular) chroma format 4:2:0. In addition the chroma formats 4:2:2 and 4:4:4 may also be supported, for example, through software only implementations, hardware only implementations, or a combination of software and hardware implementation.

While the non-hosted HEVC HDR image may be represented in any chroma format, the most popular chroma format for the HEVC HDR image supported by a relatively large number of hardware implemented decoders or codecs remains 4:2:0 also. In some operational scenarios, the HEVC HDR image encoded in the multi-asset imaging format may have a chroma format lower, worse or coarser than the chroma format adopted by the hosted JPEG SDR image in the same multi-asset imaging format.

Figure 1B:
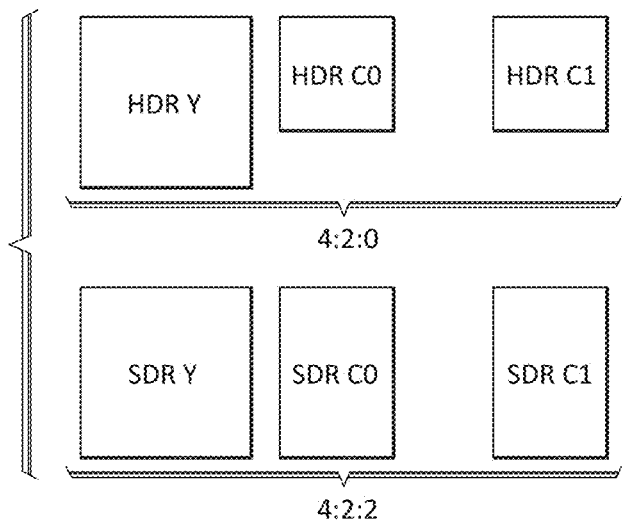

FIG. 1A and FIG. 1B illustrate example HEVC HDR and SDR images encoded in the multi-asset imaging format as received by a downstream device. The HEVC HDR image may be represented in the chroma format 4:2:0, whereas the hosted JPEG SDR image may be represented in the chroma format 4:4:4 as shown in FIG. 1A or 4:2:2 as shown in FIG. 1B. These chroma (sampling) formats may be specifically chosen to support existing JPEG and HEVC decoders already deployed in the end user devices. To handle this undesired situation in which existing JPEG or HEVC end user devices receive HDR images of relatively low chroma sampling formats, under other approaches, chroma up-sampling such as via finite impulse response (FIR) filtering can be directly applied to HDR images in coarser chroma format such as 4:2:0 to up-sample the image to a relatively high sampling format such as 4:4:4.

Figure 3A:
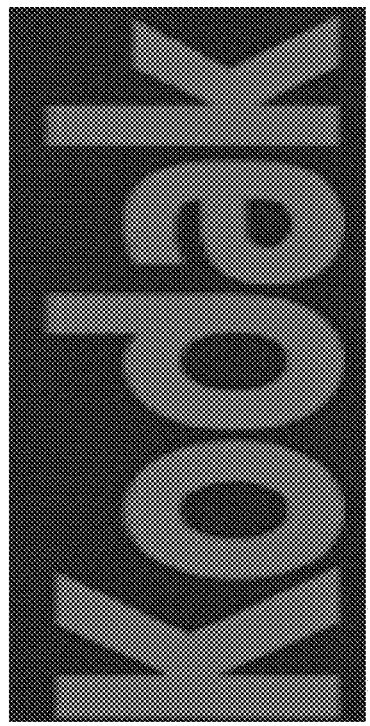
FIG. 3A illustrates example HDR source and (FIR-based) chroma upsampled images.
Figure 3A:
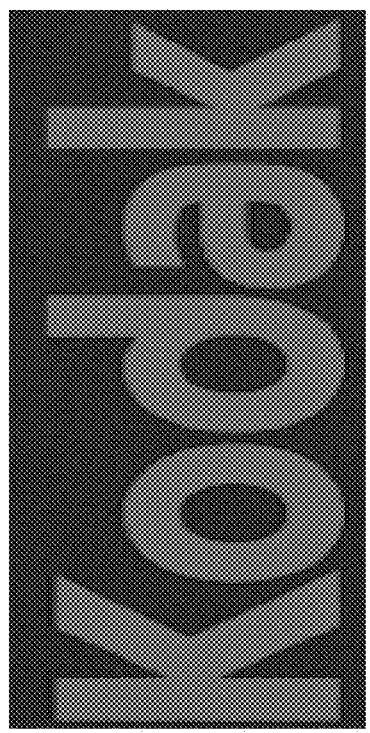

FIG. 3A illustrates an example HDR source image originally in the chroma format 4:4:4 on the left, converted to 4:2:0 (not shown), and then upconverted back to 4:4:4 on the right. The original image comprises the word "Kodak," all in red on a black background. As will be discussed later, such images with sharp edges in the chroma plane help to better test and evaluate the efficiency of the proposed algorithms. More specifically, an HEVC HDR encoder in an upstream device can generate a chroma down-sampled HDR image from the HDR source image by chroma down-sampling the HDR source image from 4:4:4 to 4:2:0. This chroma down-sampled HDR image may be included or encoded, instead of the source HDR image, in an APP11 marker of or attendant to an image file or container hosting an SDR image. An HEVC HDR decoder in an end user device receives the image file or container with the chroma down-sampled HDR image in the APP11 marker and generate the chroma up-sampled 4:4:4 HDR image on the right of FIG. 3A from the chroma down-sampled 4:2:0 HDR image by applying FIR based chroma upsampling to the chroma down-sampled HDR image.

As compared with the HDR source image on the left, the chroma up-sampled HDR image as shown on the right of FIG. 3A contains lots of artifact caused by overshooting and undershooting from the FIR filtering used in chroma up-sampling, even though both the source and chroma up-sampled images are HDR images with the same relatively high dynamic range and chroma sampling format. (Note: In the color image, one can easier see the gray artifacts within the red letters in "Kodak." Such artifacts may be harder to detect in the grayscale reproduction.)

In contrast with these other approaches, chroma upsampling as described herein can be used to overcome relatively low spatial resolution of chroma image data in (e.g., HDR, etc.) images/assets of a relatively high dynamic range included in (e.g., an APP11 marker of, etc.) a multi-asset imaging format. Such chroma upsampling or reformatting can be performed for the images/assets of the relatively high dynamic range or value, using a relatively high spatial resolution information from the luma component or channel of the same images/assets and/or from chroma components or channels of different assets such as (e.g., JPEG SDR, etc.) images/assets of a relatively low dynamic range hosted in the same multi-asset imaging format.

Chroma upsampling or reformatting as described herein can include guided filtering applied to up-sample the chroma component/channel of the images/assets of the higher dynamic range using guidance or guidance images from other components or channels of the same images/assets or different assets of the lower dynamic range, where the guidance or guidance images have higher spatial resolutions than the chroma components or channels of the images/assets of the higher dynamic range. For example, some or all available image information with higher resolutions from other components or channels of the same images/assets or components or channels of the different assets can be used to improve the images/assets of the higher dynamic range or a higher grade, thereby resulting in a relatively high final picture quality in display images rendered or displayed to end users on end user devices. In operational scenarios in which hosted (JPEG) SDR images from the same multi-asset image format have a relatively high spatial resolution as represented in a relatively high chroma format, chroma components or channels of HEVC HDR images from APP11 markers attendant to image files or containers can be enhanced to a quality comparable with or even higher than the chroma components or channels of the hosted SDR images or assets. In other words, where the hosted SDR images/assets are in the chroma format 4:4:4, the final enhanced HDR images/assets from a pre-enhanced relatively low chroma format such as 4:2:0 can achieve a relatively high quality corresponding to the chroma format 4:4:4.

Example embodiments described herein relate to generating chroma upsampled images. A first image of a first dynamic range and a second image of a second dynamic range higher than the first dynamic range are accessed. The first and second image are derived from a same source image. Based at least in part on a first chroma sampling format in which the first image is represented, it is determined whether guided filtering is to be used to generate chroma upsampled image data in a reconstructed image of the second dynamic range from the second image of the second dynamic range, the second image being represented in a second chroma sampling format less precise than a chroma sampling format of the source image. In response to determining that guided filtering is to be used to generate chroma image data in a reconstructed image of the second dynamic range from the second image of the second dynamic range, image metadata for performing the guided filtering is generated. The first image of the first dynamic range, the second image of the second dynamic range and the image metadata are encoded into an image data container to enable a recipient device of the image data container to generate the reconstructed image of the second dynamic range.

Guided Filtering

Single-channel guided filtering may be performed based at least in part on an assumed local linear correlation—e.g., in a local pixel neighborhood, in a relatively small or bounded pixel block, area or region, etc.—between a color space component or channel of an input image in which the i-th pixel is denoted as $v_i$ and a color space component or channel of a guidance image in which the i-th pixel is denoted as $r_i$.

The input image may include individual pixel values for input pixels in the color space component or channel of the input image, for example, arranged in a two-dimensional array. Similarly, the guidance image may include individual pixel values for guidance pixels in a color space component or channel of the guidance image, for example, arranged in the same two-dimensional array with the same total pixel count and layout as the input image. In some operational scenarios, the same guidance image may be used to perform guided filtering based chroma upsampling for two or more different chroma components or channels.

Let $\Phi_i$ denote a local pixel block or neighborhood of size B (pixels)×B (pixels) that includes the i-th pixel, for example, at the center. A linear model, mapping or function between a color space component or channel of a predicted image in which the i-th pixel is denoted as $\hat{v}_i$ and the color space component or channel of the guidance image may be specified with operational parameters denoted as $(\alpha_i, \beta_i)$, as follows:

$$\hat{v}_i = \alpha_i \cdot r_i + \beta_i \quad (1)$$

The color space component or channel of the predicted image may be the same as the color space component or channel of the input image. The pixels or pixel values of the predicted image in that color space component or channel are to approximate the pixels or pixel values of the input image in the same color space component or channel of the input image. The difference or error between the input image and the predicted image may be modeled as noise (in which the i-th pixel is denoted as $n_i$) as follows:

$$\hat{v}_i = v_i + n_i \quad (2)$$

Optimized values (denoted as $(\alpha_i^{opt}, \beta_i^{opt})$) for the operational parameters $(\alpha_i, \beta_i)$ used to specify the local linear model, mapping or function in expression (1) above can be generated or obtained by minimizing the difference or error (or noise) between the input image and the predicted image for pixels belonging to the pixel block or neighborhood centering at the i-th pixel, as follows:

$$\begin{aligned}(\alpha_i^{opt}, \beta_i^{opt}) &= \underset{(\alpha_i, \beta_i)}{\operatorname{argmin}} \sum\nolimits_{k \in \Phi_i} \left( \|\hat{v}_k - v_k\|^2 + \epsilon(\alpha_i)^2 \right) \\ &= \underset{(\alpha_i, \beta_i)}{\operatorname{argmin}} \sum\nolimits_{k \in \Phi_i} \left( \|\alpha_i \cdot r_k + \beta_i - v_k\|^2 + \epsilon(\alpha_i)^2 \right) \end{aligned} \quad (3)$$

where $\epsilon$ represents the degree of smoothness.

The optimal solution or optimized values $(\alpha_i^{opt}, \beta_i^{opt})$ can be obtained from expression (3) above, as follows:

$$\alpha_i^{opt} = \frac{\frac{1}{B^2} \sum_{k \in \Phi_i}(r_k \cdot v_k) - \mu_i \cdot \bar{v}_i}{(\sigma_i)^2 + \epsilon} \quad (4\text{-}1)$$

$$\beta_i^{opt} = \bar{v}_i - \alpha_i^{opt} \cdot \mu_i \quad (4\text{-}2)$$

$$\bar{v}_i = \frac{1}{B^2} \sum\nolimits_{k \in \Phi_i}(v_k) \quad (4\text{-}3)$$

where $\mu_i$ and $(\sigma_i)^2$ represent the mean and variance of $r_i$ in $\Phi_i$, respectively.

To avoid abrupt or sudden change of linear models/mappings/functions in different pixels in the local pixel block or neighborhood, in some operational scenarios, the average of the linear models, mappings or functions among the different pixels in the local neighborhood may be taken to ensure smoothness of these models, mappings or functions among different adjacent pixels, as follows:

$$\overline{\alpha}_i = \frac{1}{B^2} \sum\nolimits_{k \in \Phi_i} (\alpha_k) \quad (5\text{-}1)$$

$$\overline{\beta}_i = \frac{1}{B^2} \sum\nolimits_{k \in \Phi_i} (\beta_k) \quad (5\text{-}2)$$

Hence, the final guided filtered result or predicted image may be given as:

$$\hat{v}_i = \overline{\alpha}_i \cdot r_i + \overline{\beta}_i \quad (6)$$

The foregoing guided filtering operation may be logically, conceptually or formally denoted as follows:

$$\hat{v}_i = \text{GUIDE}(\{v_i\}, \{r_i\}, B, \varepsilon) \quad (7)$$

where B and ε are design parameters (e.g., settable with defaults, with user input, automatically, programmatically, adaptively, etc.) for the guided filtering operation.

Guided filtering as described herein may be extended from single channel to multiple channels. More specifically, as in single-channel guided filtering, multi-channel guided filtering may be performed based at least in part on an assumed local linear correlation—e.g., in a local pixel neighborhood, in a relatively small or bounded pixel block, area or region, etc.—between a color space component or channel of an input image in which the i-th pixel is denoted as $v_i$ and multiple (such as C, where C is an integer greater than one (1)) color space components or channels of a guidance image in which the i-th pixel is denoted as $r_i$.

The input image may include individual pixel values for input pixels in the color space component or channel of the input image, for example, arranged in a two-dimensional array. The guidance image may include individual pixel values for guidance pixels in the multiple color space components or channels of the guidance image. These individual pixel values of the guidance image may represent pixels or pixel positions, for example, arranged in the same two-dimensional array with the same total pixel count and/or layout as the input image. Each of the pixel values constituting the guidance image may be of at least two component pixel values respectively corresponding to at least two components or channels among all such as three components or channels of a color space.

Let $\Phi_i$ denote a local pixel block or neighborhood—e.g., centering at the i-th pixel—of size B (pixels)×B (pixels) for the i-th pixel. A linear model, mapping or function of or between a color space component or channel of a predicted image in which the i-th pixel is denoted as $\hat{v}_i$ and the multiple color space components or channels of the guidance image may be specified with operational parameters denoted as ($\alpha_i$, $\beta_i$), as follows:

$$\hat{v}_i = \alpha_i^T r_i + \beta_i \quad (8)$$

where $\alpha_i^T$ represents the transverse of a coefficient vector $\alpha_i$ among the operational parameters ($\alpha_i$, $\beta_i$). The color space component or channel of the predicted image may be the same as the color space component or channel of the input image. Predicted values for the color space component or channel of the predicted image are to approximate predicted values for the same color space component or channel of the input image.

As can be seen in expression (8) above, the filtered result or predicted pixel values of the predicted image may be a linear weighted combination from pixel values in the multiple color space components or channels of the (input) guidance image/signal with a constant term $\beta_i$ among the operational parameters ($\alpha_i$, $\beta_i$).

Optimized values (denoted as ($\alpha_i^{opt}$, $\beta_i^{opt}$)) for the operational parameters ($\alpha_i$, $\beta_i$) used to specify the local linear model, mapping or function in expression (8) above can be generated or obtained by minimizing the difference or error (or noise) between the input image and the predicted image for pixels belonging to the pixel block or neighborhood centering at the i-th pixel, as follows:

$$(\alpha_i^{opt}, \beta_i^{opt}) = \underset{(\alpha_i, \beta_i)}{\text{argmin}} \sum\nolimits_{k \in \Phi_i} \left( \|\hat{v}_k - v_k\|^2 + \epsilon(|\alpha_i|_F)^2 \right) \quad (9)$$

$$= \underset{(\alpha_i, \beta_i)}{\text{argmin}} \sum\nolimits_{k \in \Phi_i} \left( \|\alpha_i^T r_k + \beta_i - v_k\|^2 + \epsilon(|\alpha_i|_F)^2 \right)$$

where ε represents the degree of smoothness.

The optimal solution or optimized values ($\alpha_i^{opt}$, $\beta_i^{opt}$) can be obtained from expression (9) above, as follows:

$$\alpha_i^{opt} = \left( \sum\nolimits_i + \epsilon U \right)^{-1} \left( \frac{1}{B^2} \sum\nolimits_{k \in \Phi_i} (r_k \cdot v_k) - \mu_i \cdot \overline{v}_i \right) \quad (10\text{-}1)$$

$$\beta_i^{opt} = \overline{v}_i - (\alpha_i^{opt})^T \mu_i \quad (10\text{-}2)$$

$$\overline{v}_i = \frac{1}{B^2} \sum\nolimits_{k \in \Phi_i} (v_k) \quad (10\text{-}3)$$

where $\mu_i$ and $\Sigma_i$ represent the C-channel mean (vector) and the C×C covariance matrix of r in $\Phi_i$, respectively. $\mu_i$ is the C-channel mean of $r_i$ in $\Phi_i$. $\Sigma_i$ is the C×C covariance matrix of r in $\Phi_i$. U is the C×C identity matrix. The element ($\sigma_i^{(m,n)}$) in $\Sigma_i$ can be computed as $$\sigma_i^{(m,n)} = \frac{1}{B^2} \sum\nolimits_{k \in \Phi_i} r_k^{(m)} \cdot r_k^{(n)} - \mu_i^{(m)} \mu_i^{(n)} \quad (10\text{-}4)$$

To avoid abrupt or sudden change of linear models/mappings/functions in different pixels in the local pixel block or neighborhood, the average of the linear models, mappings or functions among the different pixels in the local neighborhood may be taken to ensure smoothness, as follows:

$$\overline{\alpha}_i = \frac{1}{B^2} \sum\nolimits_{k \in \Phi_i} (\alpha_k) \quad (11\text{-}1)$$

$$\overline{\beta}_i = \frac{1}{B^2} \sum\nolimits_{k \in \Phi_i} (\beta_k) \quad (11\text{-}2)$$

Hence, the final guided filtered result or predicted image may be given as:

$$\hat{v}_i = (\overline{\alpha}_i)^T r_i + \overline{\beta}_i \quad (12)$$

The foregoing guided filtering operation may be logically, conceptually formally denoted as follows:

$$\hat{v}_i = \text{GUIDE}(\{v_i\}, \{r_i\}, B, \varepsilon) \quad (13)$$

where B and ε are design parameters (e.g., settable with defaults, with user input, automatically, programmatically, adaptively, etc.) for the guided filtering operation.

In some operational scenarios, an input image and/or guidance image may be spatially subsampled. The spatially subsampled input image and/or guidance image having a relatively small set of pixels may be used in chroma upsampling, resampling or reformatting as described herein. An example relatively fast guided filtering procedure using spatially subsampled input images and/or guidance images is illustrated in TABLE 1 below. As shown in TABLE 1, an input image and a guidance image can be spatially subsampled, for example with the same subsampling factor, resulting the same subsampled pixels, into spatially subsampled input image and guidance image first. As used herein, "spatially subsampling" refers to operations that (spatially) subsample or convert a pre-subsampled image of a relatively large number of pixels to a subsampled image of a relatively small number of pixels. The spatial subsampling operations are other than, in addition to or in place of, or orthogonal to, chroma subsampling operations that (chroma) subsample or convert chroma component pixel values of a pre-subsampled image with a relatively high precision to subsampled chroma component pixel values of a subsampled image (with the same number of pixels as the pre-subsampled image) with a relatively low precision. The guided filtering operations may be performed on the spatially subsampled input image and spatially subsampled guidance image relatively fast with relatively few pixels in these subsampled images to generate filtered result or image. The filtered result or filtered image can be spatially—not chroma—upsampled (e.g., with the same upsampling factor, resulting the same upsampled pixels, etc.) into a spatially up-sampled filtered image with the same number of pixels as before subsampling.

TABLE 1

Fast guided image filter
Input: input image P, 3-channel guidance image I = (I1, I2, I3), where I1, I2, I3 represent each color channel, kernel size k for mean filter $f_{mean}$, degree of smoothness $\epsilon$, spatial subsample factor s for spatial subsample/upsample operations $f_{subsample}$ and $f_{upsample}$
Output: filtered image Q
For the 2D images, perform the following pixel-wise operations
1. Spatially Subsample
$\quad$ I1' = $f_{subsample}$ (I1, s)
$\quad$ I2' = $f_{subsample}$ (I2, s)
$\quad$ I3' = $f_{subsample}$ (I3, s)
$\quad$ P' = $f_{subsample}$ (P, s)
$\quad$ k' = k/s
2. Mean (spatially subsampled)
$\quad$ mean$_{I1}$ = $f_{mean}$ (I1')
$\quad$ mean$_{I2}$ = $f_{mean}$ (I2')
$\quad$ mean$_{I3}$ = $f_{mean}$ (I3')
$\quad$ mean$_P$ = $f_{mean}$ (P')
$\quad\quad$ mul$_{I11}$ = I1' .* I1'
$\quad\quad$ mul$_{I12}$ = I1' .* I2'
$\quad\quad$ mul$_{I13}$ = I1' .* I3'
$\quad\quad$ mul$_{I22}$ = I2' .* I2'
$\quad\quad$ mul$_{I23}$ = I2' .* I3'
$\quad\quad$ mul$_{I33}$ = I3' .* I3'
$\quad\quad$ mul$_{I1P}$ = I1' .* P'
$\quad\quad$ mul$_{I2P}$ = I2' .* P'
$\quad\quad$ mul$_{I3P}$ = I3' .* P'
3. Variance and covariance (spatially subsampled)
$\quad$ var$_{I11}$ = $f_{mean}$ (mul$_{I11}$) - mean$_{I1}$ .* mean$_{I1}$
$\quad$ var$_{I12}$ = $f_{mean}$ (mul$_{I12}$) - mean$_{I1}$ .* mean$_{I2}$
$\quad$ var$_{I13}$ = $f_{mean}$ (mul$_{I13}$) - mean$_{I1}$ .* mean$_{I3}$
$\quad$ var$_{I22}$ = $f_{mean}$ (mul$_{I22}$) - mean$_{I2}$ .* mean$_{I2}$
$\quad$ var$_{I23}$ = $f_{mean}$ (mul$_{I23}$) - mean$_{I2}$ .* mean$_{I3}$
$\quad$ var$_{I33}$ = $f_{mean}$ (mul$_{I33}$) - mean$_{I3}$ .* mean$_{I3}$
$\quad$ cov$_{I1P}$ = $f_{mean}$ (mul$_{I1p}$) - mean$_{I1}$ .* mean$_P$
$\quad$ cov$_{I2P}$ = $f_{mean}$ (mul$_{I2p}$) - mean$_{I2}$ .* mean$_P$
$\quad$ cov$_{I3P}$ = $f_{mean}$ (mul$_{I3p}$) - mean$_{I3}$ .* mean$_P$ $$\text{var}_I = \begin{bmatrix} \text{var}_{I11} & \text{var}_{I12} & \text{var}_{I13} \\ \text{var}_{I12} & \text{var}_{I22} & \text{var}_{I23} \\ \text{var}_{I13} & \text{var}_{I23} & \text{var}_{I33} \end{bmatrix}, \text{cov} = \begin{bmatrix} \text{cov}_{I1P} \\ \text{cov}_{I2P} \\ \text{cov}_{I3P} \end{bmatrix}, \text{invMat} = (\text{var}_I + \epsilon U)^{-1}$$

TABLE 1-continued

4. Ridge regression (spatially subsampled)
$\quad\quad$ a = invMat × cov
$\quad\quad$ b = mean$_P$ - a$^T$ · mean$_I$
5. Mean of regression parameters (spatially subsampled)
$\quad\quad$ mean$_a$ = $f_{mean}$ (a)
$\quad\quad$ mean$_b$ = $f_{mean}$ (b)
6. Spatially Upsample
$\quad\quad$ mean$_a$ = $f_{upsample}$ (mean$_a$)
$\quad\quad$ mean$_b$ = $f_{upsample}$ (mean$_b$)
7. Output
$\quad\quad$ Q = mean$_a^T$ · I + mean$_b$ Guided Filtering and Chroma Upsampling A framework optimized cross-asset or same-asset chroma upsampling via single- or multi-channel guided filtering may be implemented to convert an image of a relatively high dynamic range (e.g., HDR, EDR, etc.) with chroma component values of a relatively low precision as represented in a relatively coarse chroma sampling format into a chroma upsampled image of the relatively high dynamic range with upsampled chroma component values of a relatively high precision as represented in a relatively fine chroma sampling format. Some or all of the framework or components/processing blocks therein may be implemented in software, hardware, a combination of software and hardware, etc.

As used herein, "asset" refers to a distinct combination of image/video quality characteristics such as those measured or represented in terms of dynamic range, bit depth, spatial resolution, color gamut, chroma sampling formats, image refresh rate, etc. Such a distinct combination of image quality characteristics may be referred to as a color grade or an image of a color grade. Examples of color grades may include, but are not necessarily limited to only, an HDR color grade, a SDR color grade, an EDR color grade, an intermediate color grade with an intermediate dynamic range between the HDR and SDR, etc.

As used herein, "(color) channel" or "(color) component" may refer to a dimension, channel, or component of a color space in which an image is represented. Example (color) channels, components or dimensions of a color space may include, but are not necessarily limited to only, luma/luminance or Y channel, chroma/chrominance or Cb/Cr (or C0/C1) channels of an YCbCr color space; red or R channel, blue or B channel, and green or G channel of a RGB color space; and so on.

Figure 2A:
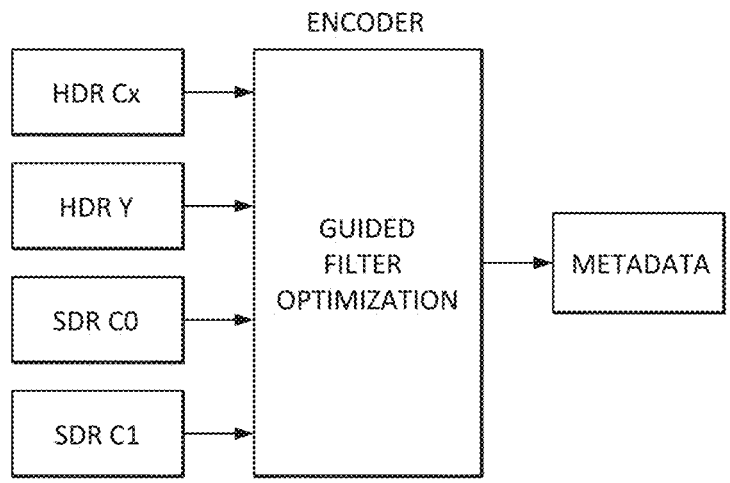
FIG. 2A and FIG. 2B illustrate example operations implemented or performed by image/video processing devices.

FIG. 2A illustrates example operations implemented or performed by an image/video encoder (or upstream image/video codec or image/video processing device).

By way of illustration but not limitation, the encoder, or blocks performing optimized chroma upsampling operations therein, accesses or receives an SDR image and an HDR image corresponding to (or depicting the same semantic visual content as) the SDR image. The SDR image and the HDR image may be generated or derived—by a camera or image acquisition device or ISP(s) therein or a post-camera image processing device—from the same source image such as a camera raw image, a non-subsampled non-compressed image, etc.

The HDR image may include chroma (e.g., pixel, codeword, etc.) values with a relatively low precision or a relatively coarse chroma sampling or subsampling format, as compared with luma (e.g., pixel, codeword, etc.) values of the HDR image and/or compared with chroma and/or luma (e.g., pixel, codeword, etc.) values of the SDR image.

In some operational scenarios, the HDR image and the SDR image may be digitally packed or packaged together by the encoder in an image container or file, a image/video stream, etc. Image metadata generated in connection with or for the HDR and SDR images may also be included in the image container, file or stream. Such image container, file or stream may be transmitted, recorded, streamed, delivered, or otherwise provided to a downstream device such as an end user device, image/video decoder, downstream image/video codec or a downstream image/video processing device, etc.

The HDR and SDR images and the image metadata generated for these images can be used by the downstream device to perform optimized chroma upsampling operations on the HDR image to generate or enhance an chroma upsampled HDR image to make it look perceptually or visually appealing, and/or display or render the chroma upsampled HDR image to viewer(s).

Denote a chroma channel of the HDR image as (HDR) Cx, where x=0 or 1, respectively representing a first chroma component/channel and a second chroma component/channel of an HDR color space in which the HDR image is represented. Denote a chroma component image formed by chroma values in the chroma channel of the HDR image as HDR Cx.

Denote the luma channel of the HDR image as (HDR) Y, representing the luma component/channel of the HDR color space in which the HDR image is represented. Denote a luma component image formed by luma values in the luma channel of the HDR image as HDR Y.

Denote a chroma channel of the SDR image as (SDR) Cx, where x=0 or 1, respectively representing a first chroma component/channel and a second chroma component/channel of an SDR color space in which the SDR image is represented. Denote a chroma component image formed by chroma values in the chroma channel of the SDR image as SDR Cx.

Figure 4A:
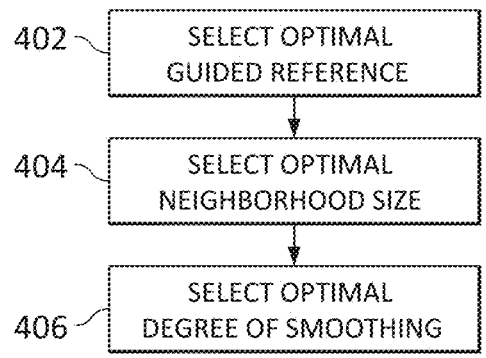
FIG. 4A through FIG. 4D illustrate example process flows.

FIG. 4A illustrates an example process flow for selecting or optimizing guided image/input and operational parameters guided filtering, which effectuates chroma upsampling operations on the HDR image in to-be-upsampled chroma component(s) or channel(s). The process flow may be implemented or performed by one or more computing devices such as a video encoder performing the operations of FIG. 2A.

Block 402 comprises selecting an optimal guided reference for the guided filtering. The optimal guided reference may be a guidance image or input denoted as $\{r_i\}$, which may be selected from a set (denoted as $\psi$) of guidance image options provided with luma and/or chroma component images of the HDR image and SDR image and used to perform guided filtering with respect to a chroma component image HDR Cx (of the HDR image).

In some operational scenarios, each element in the set $\psi$ of guidance image options may be a distinct combination of some or all of: the HDR luma component image HDR Y and SDR chroma component image(s) SDR Cx among some or all possible distinct combinations of some or all of: the HDR luma component image HDR Y and SDR chroma component image(s) SDR Cx.

By way of example but not limitation, the set $\psi$ of guidance image options may include (i) HDR Y; (ii) SDR C0; (iii) SDR C1; (iv) SDR C0+SDR C1; (v) HDR Y+SDR C0; (vi) HDR Y+SDR C1; (vii) HDR Y+SDR C0+SDR C1; and so on.

Denote an element in the set $\psi$ as $\varphi$. A specific (or optimized) guidance image or input $\{r_i\}$ representing the optimal guided reference can be chosen or selected from some or all the elements in the set $\psi$, or $\varphi \in \psi$.

Blocks 404 and 406 comprise selecting optimized operational parameters for the guided filtering, such as an optimal or optimized value for a neighborhood or block size B and an optimal or optimized value for a smoothing parameter (or degree of smoothing) $\varepsilon$.

Let $v_i^{c_x}$ denote a chroma value (in a chroma component/channel of the HDR color space) of the i-th pixel of an original or source HDR image (e.g., in chroma sampling format 4:4:4, etc.) used to derive one or both of the HDR image (with a relatively low chroma sampling format such as 4:2:0) and the SDR image. Let $v_i^Y$ denote the luma value (in the luma component/channel of the HDR color space) of the i-th pixel of the original or source HDR image (in chroma sampling format 4:4:4 in the present example).

Let $\hat{v}_i^{c_x}$ denote a reconstructed chroma value—in the same chroma sampling format 4:4:4 as the original HDR image—derived through regular FIR filtering (or chroma upsampling not based on guided filtering) from a chroma subsampled value of the i-th pixel of the HDR image with the relatively low chroma sampling format 4:2:0.

An optimized reconstructed chroma value denoted as $\hat{v}_i^{c_x}$—in the same chroma sampling format 4:4:4 as the original HDR image—may be derived through guided filtering from the reconstructed chroma value $\hat{v}_i^{c_x}$, as follows:

$$\hat{v}_i^{c_x} = \text{GUIDE}(\{\hat{v}_i^{c_x}\}, \{r_i\}, B, \varepsilon) \tag{14}$$

Optimized values for operational parameters used in the guided filtering such as the guided reference (or guided image/input), the neighborhood/block size, the smoothing parameter, etc., may be obtained as a solution to an optimization problem formulated as follows:

$$\{\varphi^{opt}, B^{opt}, \varepsilon^{opt}\} = \operatorname*{argmin}_{\varphi, B, \varepsilon} \sum_{i \in \Omega} f(\hat{v}_i^{c_x}, v_i^{c_x}) \tag{15}$$

where $\Omega$ represents (pixels constituting) regions of interests. These pixels may be selected or identified as those near edges (visually demarcating boundaries of different visual objects or image features in the images as described herein). As guided filtering based chroma upsampling seeks to improve visual quality in these regions of interests, a visual quality measurement function denoted as $(\hat{v}_i^{c_x}, v_i^{c_x})$ where $v_i^{c_x}$ denotes an original chroma value of the i-th pixel of the original HDR image (in the chroma sampling format of 4:4:4 in the present example)—may be used in expression (15) above to measure distortions between the original HDR image and guided filtered output $\hat{v}_i^{c_x}$ representing the optimized reconstructed chroma value. The visual quality measurement function $f(\hat{v}_i^{c_x}, v_i^{c_x})$ can be as simple as the norm-2 as $\|\hat{v}_i^{c_x} - v_i^{c_x}\|^2$ or can be a perceptual quality measurement function such as DEITP. Example quality measurement functions such as DEITP are described in ITU-R BT.2124-0, "Objective metric for the assessment of the potential visibility of colour differences in television," (January 2019), which is incorporated herein by reference in its entirety.

The search space for the above optimization problem in expression (15) may be relatively large. In some operational scenarios, the optimization process may be broken down or divided into three stages as illustrated in FIG. 4A. The first stage is to determine which of the possible guided references (or options) to use as guided reference/image/input, or the optimized selection $\varphi^{opt}$. The second stage is to determine the optimized value for the neighborhood/block size used to perform the guided filtering. The third stage is to decide the optimized value for the degree of smoothing or smoothing parameter used in the guided filter.

These optimized operational parameters—the specific or optimized guided image/input option selected from the set $\psi$, the optimal or optimized value for the (pixel) neighborhood or block size, the optimal or optimized value for the smoothing parameter, etc.—may be included as, the image metadata for the HDR and SDR images, in the (output) image container, file or stream by the upstream encoder.

For example, the image metadata encoded or carried in the (output) image container, file or stream may include the following (optimized) operational parameters:

(1) a first parameter (e.g., a bit, a byte, etc.) used to enable or disable guided filtering for chroma upsampling
(2) a second parameter indicating a total number of iterations for guided filtering. The same guided reference (but different to-be-filtered HDR images) may be used to carry out each iteration of guided filtering for the total number of iterations. The output or filtered HDR image generated from a preceding iteration of guided filtering may be used as a to-be-filtered HDR image for the (immediately) following iteration of guided filtering.
(3) a third parameter indicating the optimized reference option $\varphi^{opt}$ used as guided reference/image/input for guided filtering.
(4) a fourth parameter indicating the optimized value $B^{opt}$ for the neighborhood or block size used in guided filtering.
(5) a fifth parameter indicating the optimized value $\varepsilon^{opt}$ for the smoothing parameter used in guided filtering.

Figure 2B:
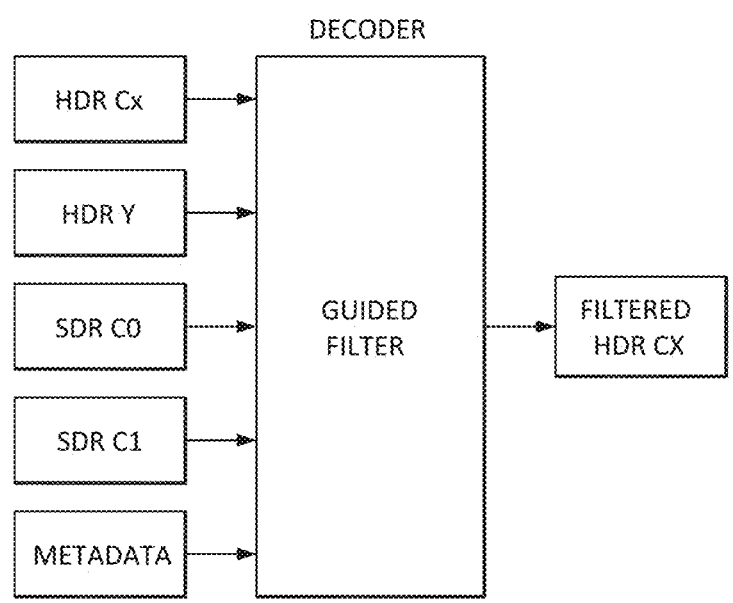

FIG. 2B illustrates example operations implemented or performed by a downstream recipient device such as an image/video decoder (or downstream image/video codec or image/video processing device).

By way of illustration but not limitation, the decoder, or blocks performing optimized chroma upsampling operations therein, receives the image container, file or stream generated by the upstream device. In response, the decoder decodes, from the image container, file or stream, some or all of the SDR image and the HDR image encoded or included in the image container, file or stream generated by the upstream device.

In some operational scenarios, the downstream recipient device can display or render the SDR image to viewer(s) without extracting the image metadata or operational parameters for the guided filtering.

In some operational scenarios, the downstream recipient device can display or render the HDR image to viewer(s) without extracting the image metadata or operational parameters for the guided filtering.

In some operational scenarios, the downstream recipient device extracts or decodes optimized operational parameters from the image container, file or stream, performs the guided filtering with these optimized operational parameters as signaled or provided by the upstream device to upsample chroma values in the HDR image, and hence generates a chroma upsampled HDR image that has a higher visual or perceptible quality than the decoded/received HDR image. Guided filtering can be performed by the decoder for a single time or iteratively for a total number of iterations as indicated in the image metadata to generate the chroma upsampled HDR image through guided filtering. The downstream recipient device can display or render the chroma upsampled HDR image to viewer(s).

Selection of Guided Reference

In various operational scenarios, an SDR image that corresponds to or accompanies a corresponding HDR image represented in a relatively low chroma sampling format may be represented in one of different chroma sampling formats. Given the chroma sampling formats of the SDR image and the HDR image, different possible guided references or options thereof may be used or tried to determine or identify an optimized guided reference option or selection among these possible guided reference options.

By way of illustration but not limitation, the optimized guided reference option may be selected or determined with a fixed or default value such as five (5) for the neighborhood/block size B (e.g., a 5×5 pixel block, etc.) and a fixed or default value such as five (5) for the smoothing parameter E. Experiments may be conducted to generate quality measurement data with respect to the different guided reference options and help decide the selection of the optimized guided reference option among the different options.

In some operational scenarios, the SDR image is represented in the chroma sampling format 4:4:4, whereas the HDR image (to be chroma upsampled) may be represented in the chroma sampling format 4:2:0.

The HDR image may be chroma upscaled or upsampled using one ($\varphi \not\in \psi$) of possible guided filtering options with or without iteration, as follows:

(1) Default chroma upscaling/upsampling (no guided reference; no guided filtering; FIR based chroma upsampling).
(2) Guided filtering for chroma upscaling/upsampling using an SDR chroma component image of the SDR image as a guided reference.
(3) Guided filtering for chroma upscaling/upsampling using the HDR luma component image of the HDR image as a guided reference.
(4) Guided filtering for chroma upscaling/upsampling using the SDR luma component image and an SDR chroma component image of the SDR image as a guided reference. This is an example of cross-asset (or cross-color-grade) multi-channel guided filtering.
(5) Guided filtering for chroma upscaling/upsampling using the HDR luma component image of the HDR image and an SDR chroma component image of the SDR image as a guided reference. This is another example of cross-asset (or cross-color-grade) multi-channel guided filtering.
(6) Iterative guided filtering for chroma upscaling/upsampling. For example, the option (2) above may be repeated for a total of two times or twice.
(7) Iterative guided filtering for chroma upscaling/upsampling. For example, the option (2) above may be repeated for a total of four times.
(8) Iterative guided filtering for chroma upscaling/upsampling. For example, the option (2) above may be repeated for a total of twenty (20) times.

These and other options for guided filtering may be experimented to determine an optimized option for guided filtering in these operational scenarios.

For example, test images may be used to evaluate, identify, or validate quantitatively the effectiveness of the optimized option for guided filtering. In an embodiment, some of the test images were selected to have sharp and clear edges in the chroma planes (e.g., color bars next to each other, overlapping color squares, each of different color, colored text over a color background, or colored rectangles next to each other). Images of graphics, or graphics over nature images are preferred over nature images alone. For the purpose of illustration only, seven different test images may be used herein. It should be noted that, in other embodiments, more or fewer test images may be used to evaluate, identify, or validate quantitatively the effectiveness of the optimized option for guided filtering.

Visual qualities of guided filtered HDR images generated from some or all of the options for guided filtering may be evaluated, through DEITP scores/measures computed based on the visual quality measurement function DEITP function by comparison with an original or source HDR image (with a relatively high chroma sampling format; e.g., 4:4:4) that give rise to one or both of the SDR image and the HDR image (with a relatively low chroma sampling format; 4:2:0 in the present example). These DEITP scores/measures may be computed for regions of interest Ω, instead of or in addition to the entire HDR image or the entire HDR image frame.

TABLE 2

| Guided Reference | Test #1 | Test #2 | Test #3 | Test #4 | Test #5 | Test #6 | Test#7 |
|---|---|---|---|---|---|---|---|
| 1 | 0.003 | 118.5 | 0.119 | 1.135 | 0.133 | 5.531 | 0.445 |
| 2 | 0.002 | 101.216 | 0.068 | 0.623 | 0.061 | 3.207 | 0.274 |
| 3 | 0.017 | 131.063 | 0.148 | 0.643 | 0.807 | 3.389 | 0.274 |
| 4 | 0.002 | 113.542 | 0.096 | 0.623 | 0.090 | 3.251 | 0.274 |
| 5 | 0.002 | 112.842 | 0.088 | 0.623 | 0.090 | 3.256 | 0.274 |
| 6 | 0.003 | 95.277 | 0.065 | 0.611 | 0.055 | 3.059 | 0.275 |
| 7 | 0.004 | 91.208 | 0.064 | 0.604 | 0.053 | 3.000 | 0.275 |
| 8 | 0.016 | 87.156 | 0.070 | 0.576 | 0.052 | 2.974 | 0.261 |

TABLE 2 above illustrates example DEITP scores/measures—the lower the score, the better the visual quality—computed using a set of test images, referred to as Test #1 through Test #7, with properties as discussed earlier. As can be seen from TABLE 2, using a 4:4:4 SDR chroma component image as a guided reference—corresponding to guided filtering option (2)—can significantly improve the performance of the guided filtering among all non-iterative options. In addition, the performance of the guided filtering can be further improved by iteratively applying the guided filtering—corresponding to guided filtering options (6), (7) and (8).

Figure 3B:
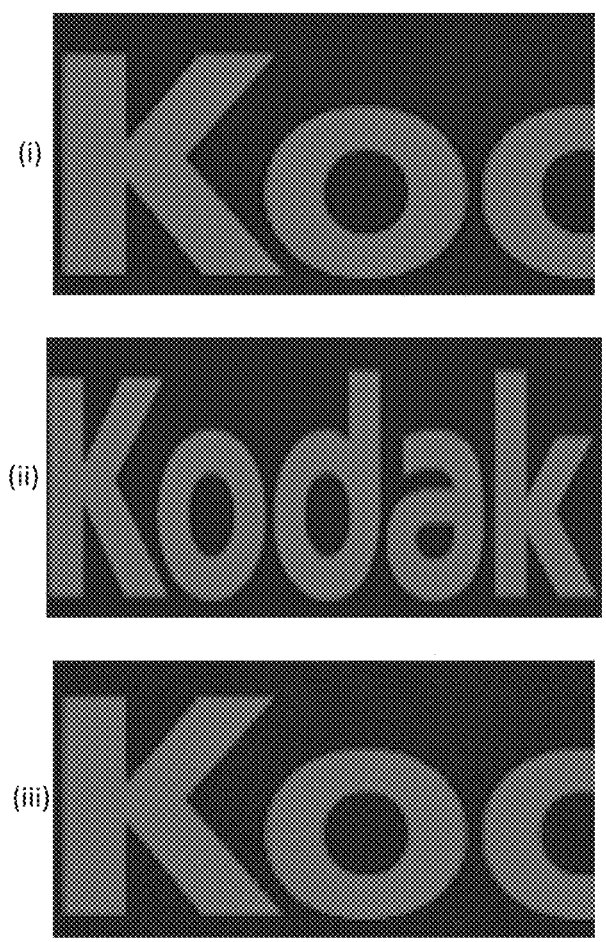
FIG. 3B illustrates example original and chroma upsampled HDR images.

FIG. 3B illustrates example original and chroma upsampled HDR images. More specifically, FIG. 3B (i) illustrates an example original or source HDR image in the chroma sampling format 4:4:4. FIG. 3B (ii) illustrates an example chroma upsampled HDR image with the chroma sampling format 4:4:4 that is chroma upsampled from an HDR image (e.g., derived from the original HDR image, etc.) with a relatively low chroma sampling format 4:2:0 using a non-guided filtering approach such as FIR-based chroma upsampling.

In comparison, FIG. 3B (iii) illustrates an example chroma upsampled HDR image with the chroma sampling format 4:4:4 that is chroma upsampled from an HDR image (e.g., derived from the original HDR image, etc.) with a relatively low chroma sampling format 4:2:0 using guided filtering, which may be performed in addition to or in place of FIR-based chroma sampling. Iterative guided filtering can be used to further improve visual or perceptible quality of the chroma upsampled HDR image of FIG. 3B (iii). For example, halo effects around the edge of the letters can be significantly reduced as more times of iterative guided filtering are applied.

In some operational scenarios, the SDR image is represented in the chroma sampling format 4:2:2, whereas the HDR image (to be chroma upsampled) may be represented in the chroma sampling format 4:2:0.

The HDR image may be chroma upscaled or upsampled using one ($\varphi \not\equiv \psi$) of possible guided filtering options with or without iteration, as follows:

(1) Default chroma upscaling/upsampling (no guided reference; no guided filtering; FIR based chroma upsampling).

(2) Guided filtering for chroma upscaling/upsampling using an SDR chroma component image of the SDR image as a guided reference.

(3) Guided filtering for chroma upscaling/upsampling using the HDR luma component image of the HDR image as a guided reference.

(4) Guided filtering for chroma upscaling/upsampling using the SDR luma component image and an SDR chroma component image of the SDR image as a guided reference. This is an example of cross-asset (or cross-color-grade) multi-channel guided filtering.

(5) Guided filtering for chroma upscaling/upsampling using the HDR luma component image of the HDR image and an SDR chroma component image of the SDR image as a guided reference. This is another example of cross-asset (or cross-color-grade) multi-channel guided filtering.

(6) First guided filtering for chroma upscaling/upsampling using the HDR luma component image of the HDR image. Then second guided filtering for chroma upscaling/upsampling using an SDR chroma component image of the SDR image as a guided reference. This is an example for serially applying two different single-channel chroma upsampling operations.

(7) First guided filtering for chroma upscaling/upsampling using an SDR chroma component image of the SDR image as a guided reference. Then second guided filtering for chroma upscaling/upsampling using the HDR luma component image of the HDR image. This is another example for serially applying two different single-channel chroma upsampling operations.

These and other options for guided filtering may be experimented to determine an optimized option for guided filtering in these operational scenarios.

For example, test images may be used to evaluate, identify or validate quantitatively the effectiveness of the optimized option for guided filtering. Visual qualities of guided filtered HDR images generated from some or all of the options for guided filtering may be evaluated, through DEITP scores/measures computed based on the visual quality measurement function DEITP function by comparison with an original or source HDR image (with a relatively high chroma sampling format; e.g., 4:4:4) that give rise to one or both of the SDR image and the HDR image (with a relatively low chroma sampling format; 4:2:0 in the present example). These DEITP scores/measures may be computed for regions of interest Ω, instead of or in addition to the entire HDR image or the entire HDR image frame.

TABLE 3

| Guided Reference | Test #1 | Test #2 | Test #3 | Test #4 | Test #5 | Test #6 | Test#7 |
|---|---|---|---|---|---|---|---|
| 1 | 0.003 | 118.5 | 0.119 | 1.135 | 0.133 | 5.531 | 0.445 |
| 2 | 0.003 | 118.194 | 0.074 | 0.888 | 0.107 | 4.259 | 0.380 |
| 3 | 0.017 | 131.063 | 0.148 | 0.643 | 0.807 | 3.389 | 0.274 |
| 4 | 0.002 | 118.321 | 0.1 | 0.89 | 0.116 | 4.284 | 0.380 |
| 5 | 0.002 | 118.504 | 0.092 | 0.889 | 0.116 | 4.288 | 0.380 |
| 6 | 0.017 | 125.475 | 0.129 | 0.737 | 0.456 | 3.779 | 0.312 |
| 7 | 0.018 | 130.765 | 0.146 | 0.634 | 0.806 | 3.307 | 0.273 |

TABLE 3 above illustrates example DEITP scores/measures—the lower the score, the better the visual quality—computed using the same seven test images as before. As can be seen from TABLE 3, using a 4:2:2 SDR chroma component image as a guided reference—corresponding to guided filtering option (2)—likely improves the performance of the chroma upsampling as compared with (no guided filtering) option (1). In comparison, using the 4:2:0 HDR luma component image as a guided reference—corresponding to guided filtering option (3)—sometimes improves the performance of the chroma upsampling even as compared with (guided filtering) option (2), but sometimes reduces the performance even as compared with (no guided filtering) option (1). In the latter case, either the change represented in the guided filtered HDR image is so small as compared with the pre-chroma-upsampled HDR image as to be relevant or meaning; or the change represented in the guided filtered HDR image is so small as compared with the pre-chroma-upsampled HDR image as to be quite different. Visual (e.g., subjective, etc.) inspection of the guided filtered HDR images indicates that guided filtering option (2) performs relatively well on Test #2 and Test #5 images. On the other hand, guided filtering option (3) performs relatively well on Test#6.

For some test images, halo artifacts in guided filtered HDR images generated using the HDR luma component image as the guided reference are significantly reduced as compared with guided filtered HDR images generated using the SDR chroma component image as the guided reference. On the other hand, for some other test images, halo artifacts in guided filtered HDR images generated using the SDR chroma component image as the guided reference are significantly reduced as compared with guided filtered HDR images generated using the HDR luma component image as the guided reference.

In some operational scenarios, the SDR image is represented in the chroma sampling format 4:2:0, whereas the HDR image (to be chroma upsampled) may be represented in the chroma sampling format 4:2:0.

The HDR image may be chroma upscaled or upsampled using one ($\varphi \not\subseteq \psi$) of possible guided filtering options with or without iteration, as follows:

(1) Default chroma upscaling/upsampling (no guided reference; no guided filtering; FIR based chroma upsampling).
(2) Guided filtering for chroma upscaling/upsampling using an SDR chroma component image of the SDR image as a guided reference.
(3) Guided filtering for chroma upscaling/upsampling using the HDR luma component image of the HDR image as a guided reference.
(4) Guided filtering for chroma upscaling/upsampling using the SDR luma component image and an SDR chroma component image of the SDR image as a guided reference. This is an example of cross-asset (or cross-color-grade) multi-channel guided filtering.
(5) Guided filtering for chroma upscaling/upsampling using the HDR luma component image of the HDR image and an SDR chroma component image of the SDR image as a guided reference. This is another example of cross-asset (or cross-color-grade) multi-channel guided filtering.

These and other options for guided filtering may be experimented to determine an optimized option for guided filtering in these operational scenarios.

For example, test images may be used to evaluate, identify or validate quantitatively the effectiveness of the optimized option for guided filtering. Visual qualities of guided filtered HDR images generated from some or all of the options for guided filtering may be evaluated, through DEITP scores/measures computed based on the visual quality measurement function DEITP function by comparison with an original or source HDR image (with a relatively high chroma sampling format; e.g., 4:4:4) that give rise to one or both of the SDR image and the HDR image (with a relatively low chroma sampling format; 4:2:0 in the present example). These DEITP scores/measures may be computed for regions of interest $\psi$, instead of or in addition to the entire HDR image or the entire HDR image frame.

TABLE 4

| Guided Reference | Test #1 | Test #2 | Test #3 | Test #4 | Test #5 | Test #6 | Test#7 |
| --- | --- | --- | --- | --- | --- | --- | --- |
| 1 | 0.003 | 118.5 | 0.119 | 1.135 | 0.133 | 5.531 | 0.445 |
| 2 | 0.003 | 118.487 | 0.120 | 1.134 | 0.132 | 5.527 | 0.445 |
| 3 | 0.017 | 131.063 | 0.148 | 0.643 | 0.807 | 3.389 | 0.274 |
| 4 | 0.003 | 118.492 | 0.118 | 1.134 | 0.132 | 5.531 | 0.445 |
| 5 | 0.003 | 118.470 | 0.118 | 1.134 | 0.132 | 5.530 | 0.445 |

TABLE 4 above illustrates example DEITP scores/measures—the lower the score, the better the visual quality—computed using the same seven test images as before. Test #1 through Test #7 in TABLE 2 refer to the seven test images as before. As can be seen from TABLE 4, using a 4:2:2 SDR chroma component image as a guided reference—corresponding to guided filtering option (2)—does not improve the performance of the chroma upsampling as compared with (no guided filtering) option (1), as the SDR chroma component image is also in the same relatively low chroma sampling format as the HDR chroma component image. In comparison, using the 4:2:0 HDR luma component image as a guided reference—corresponding to guided filtering option (3)—sometimes improves the performance of the chroma up sampling as compared with (no guided filtering) option (1), but sometimes reduces the performance as compared with (no guided filtering) option (1). For those HDR luma guided filtering test cases in which higher distortions are generated as compared with (no guided filtering) option (1), visual (e.g., subjective, etc.) inspection also indicates a relatively poor quality in the guided filtered HDR images. Hence, visual quality measurements such as DEITP scores can be computed and used to determine whether to apply guided filtering using the HDR luma component image as a guided reference or whether to apply chroma upsampling such as FIR based filtering without guided filtering.

Figure 4B:
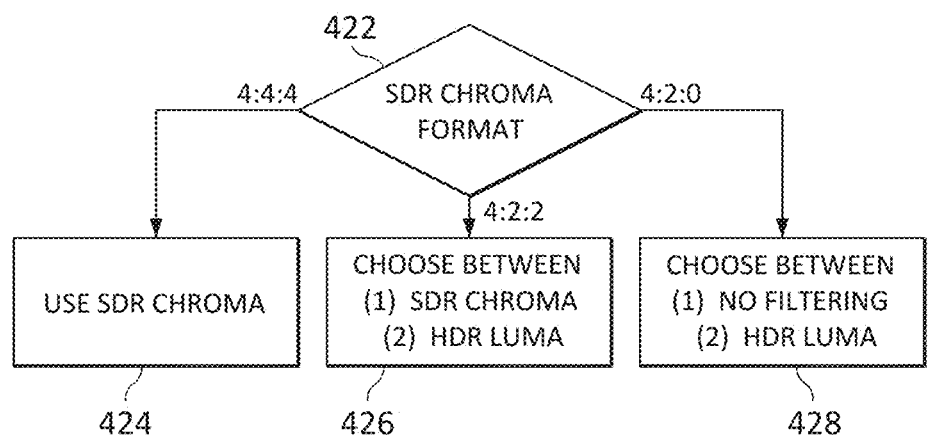

FIG. 4B illustrates an example process flow for selecting an optimized guided reference among a plurality of guided reference options. The process flow may be implemented or performed by one or more computing devices such as a video encoder performing the operations of FIG. 2A.

Block 422 comprises determining a chroma sampling format of an SDR image that is directly or indirectly derived from an original or source HDR image represented in a relatively high chroma sampling format. The SDR image may be provided with an HDR image with a relatively low chroma sampling format. The HDR image may also be directly or indirectly derived from the same original or source HDR image.

Block 424 comprises, in response determining that the chroma sampling format of the SDR image is 4:4:4, selecting an SDR chroma component image of the SDR image as a guided reference in performing guided filtering (or chroma upsampling) on the HDR image with the relatively low chroma sampling format.

Block 426 comprises, in response determining that the chroma sampling format of the SDR image is 4:2:2, selecting either an SDR chroma component image of the SDR image or the HDR luma component image of the HDR image with the relatively low chroma sampling format as a guided reference in performing guided filtering (or chroma upsampling) on the HDR image with the relatively low chroma sampling format. The selection of which of (i) the SDR chroma component image of the SDR image and (ii) the HDR luma component image of the HDR image with the relatively low chroma sampling format as the guided reference may be determined based on scores computed with a visual quality measurement (e.g., DEITP, a distance metric, an error function, etc.) function that measure visual or perceptible quality of a guided filtered HDR image in reference to that of the original or source HDR image.

Block 428 comprises, in response determining that the chroma sampling format of the SDR image is 4:2:0, selecting either FIR based chroma upsampling without guided filtering or the HDR luma component image of the HDR image with the relatively low chroma sampling format as a guided reference in performing guided filtering (or chroma upsampling) on the HDR image with the relatively low chroma sampling format. The selection of which of (i) the FIR based chroma upsampling and (ii) the HDR luma component image of the HDR image with the relatively low chroma sampling format as the guided reference may be determined based on scores computed with a visual quality measurement (e.g., DEITP, a distance metric, an error function, etc.) function that measure visual or perceptible quality of a (FIR or guided) filtered HDR image in reference to that of the original or source HDR image.

Regions of Interests

Regions of interests denoted as Q may be identified by an upstream encoder in an image as described herein (e.g., the original or source HDR image with the relatively high chroma sampling format, the SDR image, the HDR image with the relatively low chroma sampling format, etc.).

Edge (spatial) regions of a given image are the most affected parts for quality deterioration or visual distortions in chroma reformatting such as reformatting the original HDR image with the relatively high chroma sampling format (e.g., 4:4:4, etc.) into the HDR image with the relatively low chroma sampling format (e.g., 4:2:0, etc.). As used herein, an edge region refers to a spatial region formed by pixels at or near (e.g., 5 pixels around, 3 pixels around, etc.) an edge that visually separates different visual objects or image features represented in an image.

Edge regions can be detected, identified and used as the regions of interests to compute performance or quality measurements such as distortion measurements. For example, the distortion measurements such as DEITP scores may be computed using pixel or codeword values of pixels located in the edge regions.

In some operational scenarios, the regions of interests Q can be detected or identified as follows. First, edge detection operations may be performed with respect to the given image to detect edges in the given image, for example by computing a distribution of local pixel or codeword variations (e.g., local standard deviations, etc.) among pixel or codeword values of pixels in the given image. Relatively high local pixel or codeword variations (e.g., above a maximum variation threshold, etc.) indicate the presence of edges (or boundaries) between different visual objects visually or perceptibly represented in the given image. Second, the detected edges or local pixel or codeword variations for the edges (above a maximum variation threshold in the present example) can be blurred, for example using a Gaussian filter, to expand a relatively small set of pixels constituting the detected edges into a relatively large set of pixels forming spatial regions around the detected edges. Third, the blurred edges or blurred local variations may be binarized, using a binarization threshold, into a (final) binary mask. For example, a blurred local variation computed for a pixel may be set or changed to true or one (1) in the final binary mask in response to determining that the blurred local variation is no less than the binarization threshold. On the other hand, the blurred local variation computed for a pixel may be set or changed to false or zero (0) in the final binary mask in response to determining that the blurred local variation is less than the binarization threshold. Those pixels with indication of true or one (1) in the final binary mask may constitute the regions of interests $\psi$.

Example binary mask generation as well as example video codecs can be found in U.S. Provisional Patent Application Ser. No. 63/333,374, "Generating HDR Image from Corresponding Camera Raw and SDR Images," by Guan-Ming Su et al., filed on 21 Apr. 2022, the contents of which are entirely incorporated herein by reference as if fully set forth herein.

Guided Filter Parameter Selection

In various operational scenarios, given the chroma sampling formats of the SDR image and the HDR image, different possible values for the neighborhood/block size and/or the smoothing parameter may be used or tried to determine or identify optimized values for these operational parameters (or guided filter parameters) in guided filtering among these possible values.

By way of illustration but not limitation, these values may be selected or determined with a fixed or default guided reference such as an optimized guided reference already selected from among the possible guided references. Experiments may be conducted to generate performance or quality measurement data with respect to the different values of the operational parameters and help decide the selection of the optimized values among the different values of these operational parameters.

The performance or quality measurements may be computed or generated with respect to the identified or detected regions of interests for the purpose of speeding up the guided filter parameter decision or selection. (Additionally, optionally or alternatively, the regions of interests can be used for performance and quality measurements used in the selection or decision of the optimized guided reference option among the different possible guided reference options.)

Given the optimal model or optimized guided reference $\varphi^{opt}$, optimized values for the operational parameters ($B^{opt}$, $\varepsilon^{opt}$) used in guided filtering can be searched for and determined by minimizing the cost function $\Sigma_{i \in \Omega} f(\hat{v}_i^{c_x}, v_i^{c_x})$ with respect to the regions of interests, as follows:

$$\{B^{opt}, \varepsilon^{opt}\} = \underset{B,\varepsilon}{\operatorname{argmin}} \sum_{i \in \Omega} f(\hat{v}_i^{c_x}, v_i^{c_x}) \tag{16}$$

Direct solving this minimization problem would involve a two-dimensional search. From the experiments, the degree of smoothing has been found less sensitive or less capable of causing variations in values of the cost function. In some operational scenarios, instead of conducting a direct two-dimensional search for both optimized values ($B^{opt}$, $\varepsilon^{opt}$) for the operational parameters, a 1-D search may be first conducted to try different values, or search for the optimized value $\{B^{opt}\}$, for the neighborhood/block size B with a fixed or default degree of smoothing or smoothing parameter the operational parameters $\varepsilon$, as follows:

$$\{B^{opt}\} = \operatorname*{argmin}_{B} \sum_{i \in \Omega} f\!\left(\hat{v}_i^{cx}, v_i^{cx}\right) \text{ given } \varphi^{opt} \quad (17)$$

Then, a second 1-D search may be conducted to try different values, for search for the optimized value $\{\varepsilon^{opt}\}$, for the degree of smoothing or smoothing parameter $\varepsilon$, as follows:

$$\{\varepsilon^{opt}\} = \operatorname*{argmin}_{\varepsilon} \sum_{i \in \Omega} f\!\left(\hat{v}_i^{cx}, v_i^{cx}\right) \text{ given } \varphi^{opt} \text{ and } B^{opt} \quad (18)$$

In other words, the 2-D search may be divided or partitioned into two (separate) 1-D searches. In various operational scenarios, the optimization process based on these search strategies can be implemented or performed for different combinations of chroma sampling formats in the SDR image and the HDR image.

In some operational scenarios, the SDR image is represented in the chroma sampling format 4:4:4, whereas the HDR image (to be chroma upsampled) may be represented in the chroma sampling format 4:2:0.

TABLE 5

| Neighborhood Size | Test image | | | | | | |
|---|---|---|---|---|---|---|---|
| | Test #1 | Test #2 | Test #3 | Test #4 | Test #5 | Test #6 | Test#7 |
| 3 | 0.002 | 110.701 | 0.091 | 0.693 | 0.089 | 3.624 | 0.293 |
| 5 | 0.002 | 101.216 | 0.068 | 0.623 | 0.061 | 3.207 | 0.274 |
| 7 | 0.003 | 94.826 | 0.063 | 0.616 | 0.057 | 3.091 | 0.275 |
| 9 | 0.003 | 91.429 | 0.062 | 0.611 | 0.055 | 3.004 | 0.275 |
| 11 | 0.004 | 90.051 | 0.061 | 0.607 | 0.054 | 2.947 | 0.275 |
| 13 | 0.006 | 89.392 | 0.060 | 0.604 | 0.053 | 2.906 | 0.274 |
| 15 | 0.007 | 88.689 | 0.060 | 0.601 | 0.053 | 2.883 | 0.272 |
| 17 | 0.009 | 87.863 | 0.060 | 0.599 | 0.052 | 2.866 | 0.270 |
| 19 | 0.011 | 87.033 | 0.060 | 0.596 | 0.052 | 2.850 | 0.268 |
| 21 | 0.014 | 86.313 | 0.061 | 0.595 | 0.052 | 2.844 | 0.266 |
| 23 | 0.016 | 85.719 | 0.062 | 0.593 | 0.052 | 2.829 | 0.264 |
| 25 | 0.019 | 85.225 | 0.063 | 0.592 | 0.052 | 2.817 | 0.263 |
| 27 | 0.022 | 84.792 | 0.065 | 0.591 | 0.052 | 2.811 | 0.262 |
| 29 | 0.025 | 84.372 | 0.067 | 0.591 | 0.052 | 2.807 | 0.261 |

TABLE 5 above illustrates example DEITP scores/measures—the lower the score, the better the visual quality—computed for different values for the neighborhood/block size B with a fixed or constant value of $\varepsilon=5$. These DEITP scores/measures are computed using the seven test images as the original or source HDR images and using the SDR chroma component image as the guided reference. Test #1 through Test #7 in TABLE 5 refer to the seven test images as before.

As can be seen from TABLE 5, for Tests #2, #4, #6 and #7, a higher value of B results in better performance or quality. For Test #1, a higher value of B results in worse performance or quality (although the performance or quality degradation is not subjectively visible). For Tests #3 and 5, optimal performance is obtained using an intermediate value (or a mid-range value among the possible values tried or searched) of B. It may be noted that a higher value of B could result in increased guided filter size, which in turn makes applying guided filtering more complex or at a higher computational cost.

TABLE 6

| $\varepsilon$ | Test image | | | | | | |
|---|---|---|---|---|---|---|---|
| | Test #1 | Test #2 | Test #3 | Test #4 | Test #5 | Test #6 | Test#7 |
| 1 | 0.003 | 91.429 | 0.062 | 0.611 | 0.055 | 3.004 | 0.275 |
| 3 | 0.003 | 91.429 | 0.062 | 0.611 | 0.055 | 3.004 | 0.275 |
| 5 | 0.003 | 91.429 | 0.062 | 0.611 | 0.055 | 3.004 | 0.275 |
| 7 | 0.003 | 91.429 | 0.062 | 0.611 | 0.055 | 3.004 | 0.275 |
| 9 | 0.003 | 91.429 | 0.062 | 0.611 | 0.055 | 3.004 | 0.275 |
| 11 | 0.003 | 91.429 | 0.062 | 0.611 | 0.055 | 3.004 | 0.275 |
| 13 | 0.003 | 91.429 | 0.062 | 0.611 | 0.055 | 3.004 | 0.275 |
| 15 | 0.003 | 91.429 | 0.062 | 0.611 | 0.055 | 3.004 | 0.275 |
| 100 | 0.004 | 91.430 | 0.062 | 0.612 | 0.055 | 3.004 | 0.276 |
| 1000 | 0.008 | 91.430 | 0.069 | 0.614 | 0.055 | 3.005 | 0.276 |

TABLE 6 above illustrates example DEITP scores or values for the different test images computed while varying values of E and keeping the neighborhood size (B) to a constant value (e.g., B=9, etc.) from additional experiments and analyses. As shown, there is no significant effect or variation in the DEITP scores or values for a given test image while varying E.

Hence, in the operational scenarios in which the SDR image is represented in the chroma sampling format 4:4:4, a full search may be conducted by an upstream encoder for determining the optimized values for the neighborhood size B. Additionally, optionally or alternatively, the degree of smoothing may, but is not required to, be searched if further refinement is needed.

In some operational scenarios, the SDR image is represented in the chroma sampling format 4:2:2, whereas the HDR image (to be chroma upsampled) may be represented in the chroma sampling format 4:2:0.

TABLE 7

| Neighborhood Size | Test image | | | | | | |
|---|---|---|---|---|---|---|---|
| | Test #1 | Test #2 | Test #3 | Test #4 | Test #5 | Test #6 | Test#7 |
| 3 | 0.003 | 118.261 | 0.096 | 0.928 | 0.117 | 4.529 | 0.390 |
| 5 | 0.003 | 118.194 | 0.074 | 0.888 | 0.107 | 4.259 | 0.380 |
| 7 | 0.003 | 118.183 | 0.068 | 0.882 | 0.105 | 4.178 | 0.379 |
| 9 | 0.004 | 118.190 | 0.066 | 0.879 | 0.105 | 4.118 | 0.378 |
| 11 | 0.005 | 118.198 | 0.065 | 0.876 | 0.105 | 4.079 | 0.377 |
| 13 | 0.006 | 118.201 | 0.064 | 0.875 | 0.105 | 4.052 | 0.376 |
| 15 | 0.008 | 118.201 | 0.063 | 0.874 | 0.104 | 4.037 | 0.374 |
| 17 | 0.010 | 118.200 | 0.063 | 0.873 | 0.104 | 4.026 | 0.372 |
| 19 | 0.012 | 118.197 | 0.063 | 0.873 | 0.104 | 4.017 | 0.371 |
| 21 | 0.014 | 118.194 | 0.063 | 0.874 | 0.104 | 4.013 | 0.369 |
| 23 | 0.016 | 118.192 | 0.064 | 0.874 | 0.104 | 4.005 | 0.368 |
| 25 | 0.019 | 118.192 | 0.065 | 0.876 | 0.104 | 3.999 | 0.366 |

TABLE 8

| Neighborhood Size | Test image | | | | | | |
|---|---|---|---|---|---|---|---|
| | Test #1 | Test #2 | Test #3 | Test #4 | Test #5 | Test #6 | Test#7 |
| 3 | 0.007 | 122.913 | 0.116 | 0.697 | 0.488 | 3.648 | 0.293 |
| 5 | 0.017 | 131.063 | 0.148 | 0.643 | 0.807 | 3.389 | 0.274 |
| 7 | 0.033 | 139.838 | 0.215 | 0.663 | 1.018 | 3.927 | 0.275 |
| 9 | 0.053 | 148.036 | 0.301 | 0.697 | 1.168 | 4.653 | 0.275 |
| 11 | 0.079 | 154.801 | 0.396 | 0.744 | 1.274 | 5.483 | 0.275 |

TABLE 7 and TABLE 8 above illustrate example DEITP scores/measures—the lower the score, the better visual quality—computed for different values for the neighborhood/block size B with a fixed or constant value of $\varepsilon=5$. These DEITP scores/measures are computed using the same test images as the original or source HDR images and using either the SDR chroma component image or the HDR luma component image as the guided reference. Test #1 through Test #7 in TABLE 7 refer to the same seven test images as before.

More specifically, TABLE 7 illustrates example DEITP scores/measures generated or computed using the SDR chroma component image as the guidance (or guided reference) for guided filtering. As can be seen, changing the value of B does not result in significant differences in the performance or quality. Either B=7 or B=5 may be used as an optimized value for the neighborhood/block size.

TABLE 9

| $\varepsilon$ | Test image | | | | | | |
|---|---|---|---|---|---|---|---|
| | Test #1 | Test #2 | Test #3 | Test #4 | Test #5 | Test #6 | Test#7 |
| 0.01 | 0.003 | 118.183 | 0.068 | 0.883 | 0.105 | 4.178 | 0.379 |
| 0.1 | 0.003 | 118.183 | 0.068 | 0.883 | 0.105 | 4.178 | 0.379 |
| 0.5 | 0.003 | 118.183 | 0.068 | 0.882 | 0.105 | 4.178 | 0.379 |
| 1 | 0.003 | 118.183 | 0.068 | 0.882 | 0.105 | 4.178 | 0.379 |
| 3 | 0.003 | 118.183 | 0.068 | 0.882 | 0.105 | 4.178 | 0.379 |
| 5 | 0.003 | 118.183 | 0.068 | 0.882 | 0.105 | 4.178 | 0.379 |
| 7 | 0.003 | 118.183 | 0.068 | 0.882 | 0.105 | 4.178 | 0.379 |
| 9 | 0.003 | 118.183 | 0.068 | 0.882 | 0.105 | 4.178 | 0.379 |

TABLE 9 above illustrates example DEITP scores or values for the different test images computed while varying values of E and keeping the neighborhood size (B) to a constant value (e.g., B=7, etc.) from additional experiments and analyses. As shown, there is no significant effect or variation in the DEITP scores or values for a given test image while varying $\varepsilon$.

TABLE 8 illustrates example DEITP scores/measures generated or computed using the HDR luma component image as the guidance (or guided reference) for guided filtering. As can be seen, the trends are quite clear, a value of B=5 generates the best performance or quality. Any higher values of B result in worse performance.

TABLE 10

| $\varepsilon$ | Test image | | | | | | |
|---|---|---|---|---|---|---|---|
| | Test #1 | Test #2 | Test #3 | Test #4 | Test #5 | Test #6 | Test#7 |
| 0.1 | 0.018 | 131.063 | 0.148 | 0.643 | 0.793 | 3.389 | 0.274 |
| 0.5 | 0.018 | 131.063 | 0.148 | 0.643 | 0.803 | 3.389 | 0.274 |
| 1 | 0.018 | 131.063 | 0.148 | 0.643 | 0.805 | 3.389 | 0.274 |
| 3 | 0.018 | 131.063 | 0.148 | 0.643 | 0.806 | 3.389 | 0.274 |
| 5 | 0.017 | 131.063 | 0.148 | 0.643 | 0.807 | 3.389 | 0.274 |
| 7 | 0.017 | 131.063 | 0.148 | 0.643 | 0.807 | 3.389 | 0.274 |
| 9 | 0.017 | 131.063 | 0.148 | 0.643 | 0.807 | 3.389 | 0.274 |

TABLE 10 above illustrates example DEITP scores or values for the different test images computed while varying values of E and keeping the neighborhood size (B) to a constant value (e.g., B=7, etc.) from additional experiments and analyses. As shown, there is no significant effect or variation in the DEITP scores or values for a given test image while varying $\varepsilon$.

Hence, in the operational scenarios in which the SDR image is represented in the chroma sampling format 4:2:2, two modes corresponding to two different guided reference options may be searched. For each of the two modes, performance or quality measurements may not vary with different values for the neighborhood/block size B, and also may not vary with different values for the smoothing parameter E. Thus, fixed values (e.g., 3 for B, 5 for B, 5 for $\varepsilon$, etc.) may be used for these parameters without searching. Further refinement when using the SDR chroma component image as the guidance may be performed to determine whether any other value (than a fixed value) in a relatively large range of values for the neighborhood/block size B can generate better performance or quality. Likewise, further refinement when using the HDR luma component image as the guidance may be performed to determine whether a value of 5 or 7 for the neighborhood/block size B can generate better performance or quality.

In some operational scenarios, the SDR image is represented in the chroma sampling format 4:2:0, whereas the HDR image (to be chroma upsampled) may be represented in the chroma sampling format 4:2:0.

TABLE 11

| Neighborhood Size | Test image | | | | | | |
|---|---|---|---|---|---|---|---|
| | Test #1 | Test #2 | Test #3 | Test #4 | Test #5 | Test #6 | Test#7 |
| 3 | 0.007 | 122.913 | 0.116 | 0.697 | 0.488 | 3.648 | 0.293 |
| 5 | 0.017 | 131.063 | 0.148 | 0.643 | 0.807 | 3.389 | 0.274 |
| 7 | 0.033 | 139.838 | 0.215 | 0.663 | 1.018 | 3.927 | 0.275 |
| 9 | 0.053 | 148.036 | 0.301 | 0.697 | 1.168 | 4.653 | 0.275 |
| 11 | 0.079 | 154.801 | 0.396 | 0.744 | 1.274 | 5.483 | 0.275 |

TABLE 11 above illustrates example DEITP scores/measures—the lower the score, the better the visual quality—computed for different values for the neighborhood/block size B with a fixed or constant value of $\varepsilon=5$. These DEITP scores/measures are computed using the same seven test images as the original or source HDR images and using either the SDR chroma component image or the HDR luma component image as the guided reference.

As can be seen in TABLE 11, the trends are quite clear. For the instances when guided filtering is performed with a guidance image such as the HDR luma component image, a value of B=3 or 5 for the neighborhood/block size may be used to achieve a relatively high performance or quality. Higher values of B result in worse performance or quality.

TABLE 12

| ε | Test #1 | Test #2 | Test #3 | Test #4 | Test #5 | Test #6 | Test#7 |
|---|---|---|---|---|---|---|---|
| | | | | Test image | | | |
| 0.1 | 0.018 | 131.063 | 0.148 | 0.643 | 0.793 | 3.389 | 0.274 |
| 0.5 | 0.018 | 131.063 | 0.148 | 0.643 | 0.803 | 3.389 | 0.274 |
| 1 | 0.018 | 131.063 | 0.148 | 0.643 | 0.805 | 3.389 | 0.274 |
| 3 | 0.018 | 131.063 | 0.148 | 0.643 | 0.806 | 3.389 | 0.274 |
| 5 | 0.017 | 131.063 | 0.148 | 0.643 | 0.807 | 3.389 | 0.274 |
| 7 | 0.017 | 131.063 | 0.148 | 0.643 | 0.807 | 3.389 | 0.274 |
| 9 | 0.017 | 131.063 | 0.148 | 0.643 | 0.807 | 3.389 | 0.274 |

TABLE 12 above illustrates example DEITP scores or values for the different test images computed while varying values of E and keeping the neighborhood size (B) to a constant value (e.g., B=5, etc.) from additional experiments and analyses. As shown, there is no significant effect or variation in the DEITP scores or values for a given test image while varying ε.

Hence, in the operational scenarios in which the SDR image is represented in the chroma sampling format 4:2:0, a fixed value such as 3 or 5 may be used for the neighborhood/block size B in response to a determination that guided filtering can achieve a higher performance or quality than no guided filtering. Further refinement may be achieved in the case of guided filtering by evaluating or searching for the better alternative between a value of 3 and a value of 5 for the neighborhood/block size B.

For the purpose of illustration only, it has been described that a guided reference option for guided filtering herein may use one or more component images from a color grade such as an SDR or HDR color grade, or from two color grades such as SDR and HDR color grades. It should be noted that in other operational scenarios, images or component images of additional or other color grade(s) may be used as guided images (e.g., as a vector of guided images, etc.) in guided filtering as described herein. For example, an intermediate color grade with an intermediate dynamic range between SDR and HDR may be contained in an image data container, file or stream along with an optimized guided reference that may identify guided images or a vector of guided images that include images or component images from one, two or more color grades such as SDR, HDR and the intermediate color grade.

For the purpose of illustration only, it has been described that edge preserving filtering such as guided filtering may be implemented or performed to use one or more component images from a color grade such as an SDR or HDR color grade, or from two color grades such as SDR and HDR color grades for the purpose of generating enhanced image data in an output image such as an HDR image. It should be noted that in other operational scenarios, other edge preserving filtering other than guided filtering as described herein can be implemented or performed in place of or in addition to the guided filtering. For example, in some operational scenarios, edge preserving filtering such as joint bilateral filtering, cross bilateral filtering, guided bilateral filtering, etc., may be used in place of or in addition to the guided filtering to use one or more component images from the same image asset or from a different image asset depicting the same visual content to generate enhanced image data in an output image asset such as an HDR image. Example edge preserving filtering or filters are described in Laurent Caraffa et al., "The Guided Bilateral Filter: When the Joint/Cross Bilateral Filter Becomes Robust," IEEE Transactions on Image Processing (2015), 24 (4), pp 1199-1208, which is incorporated herein by reference in its entirety.

Example Process Flows

Figure 4C:
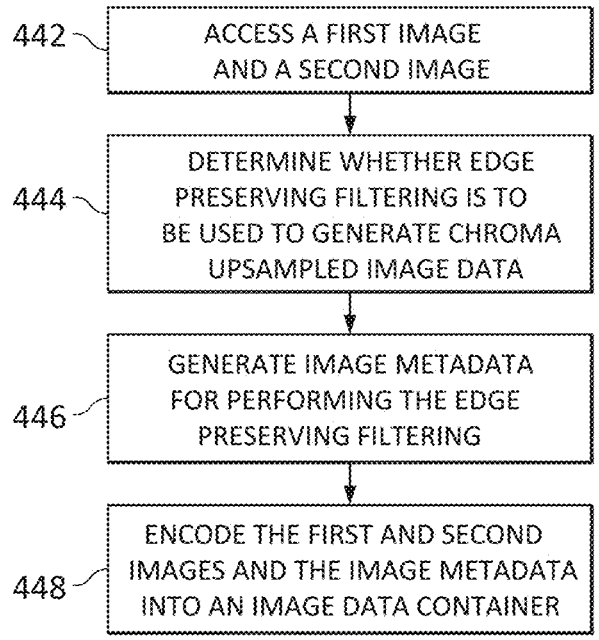

FIG. 4C illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, an upstream device as performing the operations of FIG. 2A, etc.) may perform this process flow. In block 442, an image processing system accesses a first image of a first dynamic range and a second image of a second dynamic range higher than the first dynamic range, the first and second image being derived from a same source image.

In block 444, the image processing system determines, based at least in part on a first chroma sampling format in which the first image is represented, whether edge preserving filtering is to be used to generate chroma upsampled image data in a reconstructed image of the second dynamic range from the second image of the second dynamic range, the second image being represented in a second chroma sampling format less precise than a chroma sampling format of the source image.

In block 446, the image processing system generates image metadata for performing the edge preserving filtering in response to determining that edge preserving filtering is to be used to generate chroma image data in a reconstructed image of the second dynamic range from the second image of the second dynamic range.

In block 448, the image processing system encodes the first image of the first dynamic range, the second image of the second dynamic range and the image metadata into an image data container to enable a recipient device of the image data container to generate the reconstructed image of the second dynamic range.

In an embodiment, the first dynamic range represents a relatively low dynamic range; the second dynamic range represents a relatively high dynamic range; wherein the source image is of a dynamic range no less than the second dynamic range.

In an embodiment, the edge preserving filtering is performed with a guided reference option specifically selected from a set containing a plurality guided reference options.

In an embodiment, the guided reference option identifies a single component image selected from component images of the first image and the second image as a guided image for the edge preserving filtering.

In an embodiment, the guided reference option identifies multiple different component images selected from component images of the first image and the second image as guided images for the edge preserving filtering.

In an embodiment, the image metadata includes one or more of: a first indicator to indicate whether the second image is to be chroma upsampled through the edge preserving filtering; a second indicator to indicate how many iterations of the edge preserving filtering are to be performed; a third indicator to indicate the guided reference option; a fourth indicator to indicate a neighborhood size in the edge preserving filtering; a fifth indicator to indicate a degree of smoothing in the edge preserving filtering; etc.

In an embodiment, a chroma component image of the first image is selected to be identified by the guided reference option in response to determining that the first chroma sampling format of the first image is a 4:4:4 chroma sampling format.

In an embodiment, one of a chroma component image of the first image or a luma component image of the second image is selected to be identified by the guided reference option in response to determining that the first chroma sampling format of the first image is a 4:2:2 chroma sampling format.

In an embodiment, one of no edge preserving filtering or a luma component image of the second image is selected to be identified by the guided reference option in response to determining that the first chroma sampling format of the first image is a 4:2:0 chroma sampling format.

In an embodiment, quality measurements are generated and used to determine an optimized values for at least one operational parameter included in the image metadata.

In an embodiment, an optimized value for a neighborhood size used in the edge preserving filtering is identified by an upstream device using a full search of a range of possible values in response to determining that the first chroma sampling format of the first image is a 4:4:4 chroma sampling format.

In an embodiment, an optimized value for a neighborhood size used in the edge preserving filtering is selected based at least in part on a guided image identified by the guided reference option in response to determining that the first chroma sampling format of the first image is a 4:2:2 chroma sampling format.

In an embodiment, an optimized value for a neighborhood size used in the edge preserving filtering is selected as a specific fixed value in response to determining that the first chroma sampling format of the first image is a 4:2:0 chroma sampling format.

Figure 4D:
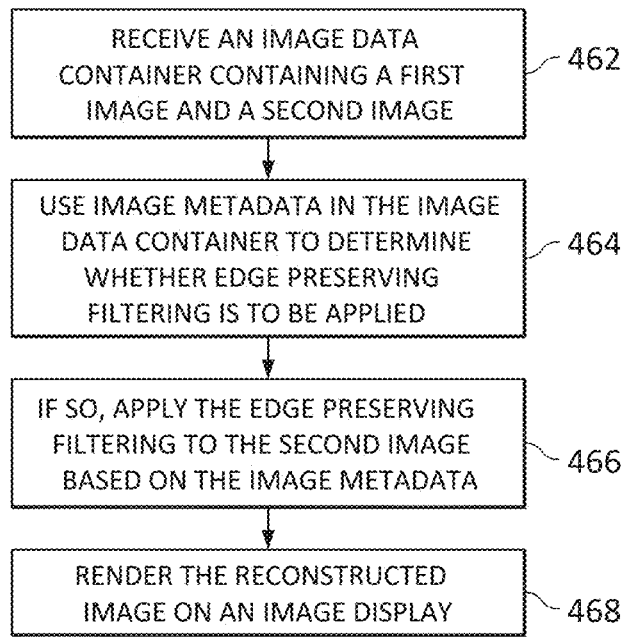

FIG. 4D illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, a downstream device performing the operations of FIG. 2B, etc.) may perform this process flow. In block 462, an image processing system receives an image data container containing a first image of a first dynamic range and a second image of a second dynamic range higher than the first dynamic range, the first and second image being derived from a same source image.

In block 464, the image processing system uses image metadata in the image data container to determine whether edge preserving filtering is to be applied to generate chroma upsampled image data in a reconstructed image of the second dynamic range from the second image of the second dynamic range, the second image being represented in a second chroma sampling format less precise than a chroma sampling format of the source image.

In block 466, the image processing system applies, in response to determining that edge preserving filtering is to be used to generate chroma image data in a reconstructed image of the second dynamic range from the second image of the second dynamic range, the edge preserving filtering to the second image based on the image metadata to generate the reconstructed image of the second dynamic range.

In block 468, the image processing system renders the reconstructed image on an image display to a viewer.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
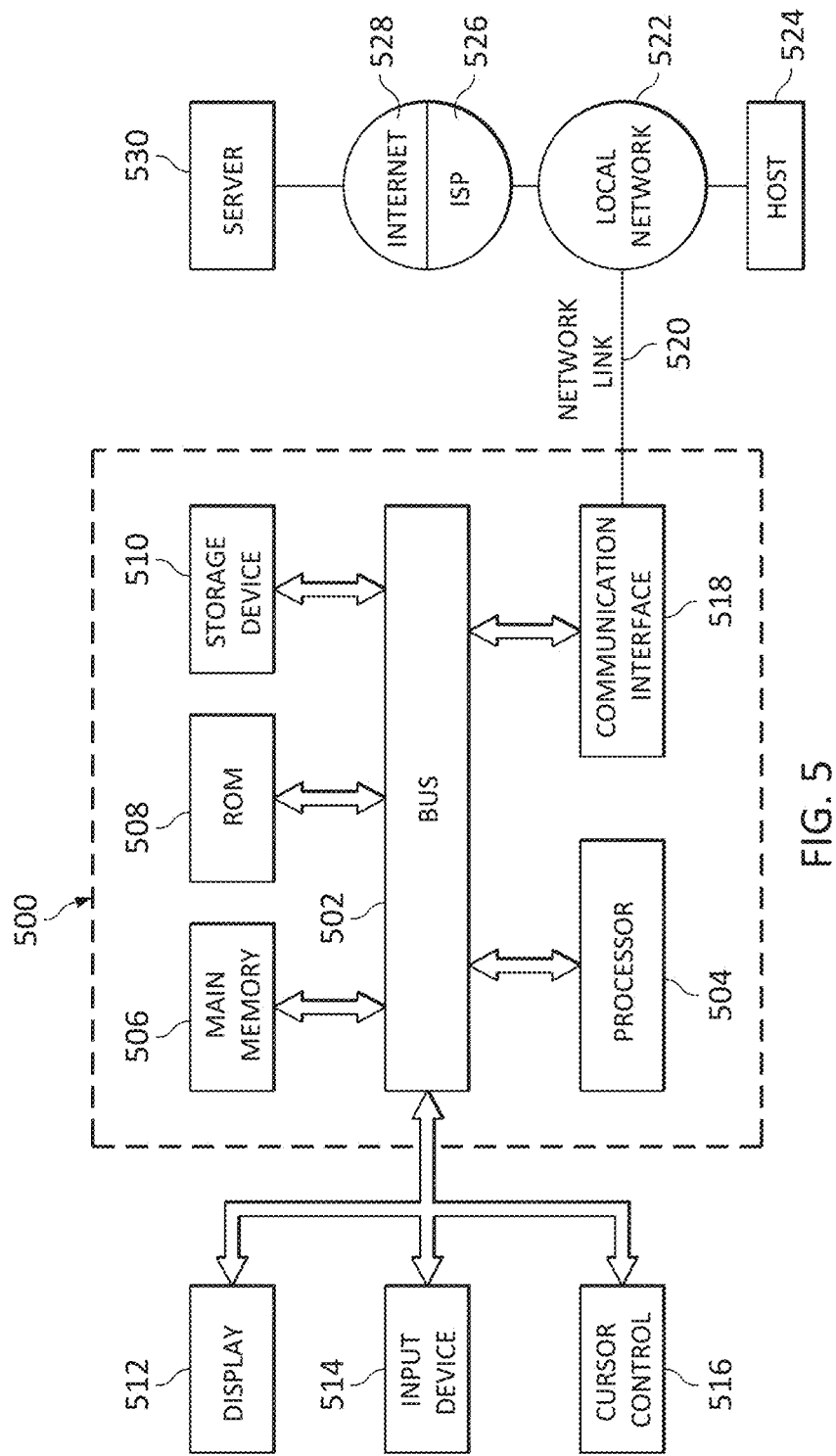
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
accessing a first image of a first luminance dynamic range and a second image of a second luminance dynamic range, the first and second image being derived from a same source image, the first luminance dynamic range being different from the second luminance dynamic range;
based at least in part on a first chroma sampling format in which the first image is represented, determining whether edge preserving filtering is to be used to generate chroma upsampled image data in a reconstructed image of the second luminance dynamic range from the second image of the second luminance dynamic range, the second image being represented in a second chroma sampling format less precise than a chroma sampling format of the source image;
in response to determining that edge preserving filtering is to be used to generate chroma image data in a reconstructed image of the second luminance dynamic range from the second image of the second luminance dynamic range, generating image metadata for performing the edge preserving filtering;
encoding the first image of the first luminance dynamic range, the second image of the second luminance dynamic range and the image metadata into an image data container to enable a recipient device of the image data container to generate the reconstructed image of the second luminance dynamic range.

2. The method of claim 1, wherein the first luminance dynamic range represents a relatively low dynamic range; wherein the second luminance dynamic range represents a relatively high dynamic range; wherein the source image is of a luminance dynamic range no less than the second dynamic range.

3. The method of claim 1, wherein the edge preserving filtering is performed with a guided reference option specifically selected from a set containing a plurality guided reference options.

4. The method of claim 3, wherein the guided reference option identifies a single component image selected from component images of the first image and the second image as a guided image for the edge preserving filtering.

5. The method of claim 3, wherein the guided reference option identifies multiple different component images selected from component images of the first image and the second image as guided images for the edge preserving filtering.

6. The method of claim 5, wherein the image metadata includes one or more of: a first indicator to indicate whether the second image is to be chroma upsampled through the edge preserving filtering; a second indicator to indicate how many iterations of the edge preserving filtering are to be performed; a third indicator to indicate the guided reference option; a fourth indicator to indicate a neighborhood size in the edge preserving filtering; or a fifth indicator to indicate a degree of smoothing in the edge preserving filtering.

7. The method of claim 6, wherein a chroma component image of the first image is selected to be identified by the guided reference option in response to determining that the first chroma sampling format of the first image is a 4:4:4 chroma sampling format.

8. The method of claim 7, wherein one of a chroma component image of the first image or a luma component image of the second image is selected to be identified by the guided reference option in response to determining that the first chroma sampling format of the first image is a 4:2:2 chroma sampling format.

9. The method of claim 8, wherein one of no edge preserving filtering or a luma component image of the second image is selected to be identified by the guided reference option in response to determining that the first chroma sampling format of the first image is a 4:2:0 chroma sampling format.

10. The method of claim 9, wherein quality measurements around regions of interest are generated and used to determine an optimized values for at least one operational parameter included in the image metadata; wherein the regions of interest include user perceptible edges separating different image features.

11. The method of claim 10, wherein an optimized value for a neighborhood size used in the edge preserving filtering is identified by an upstream device using a full search of a range of possible values in response to determining that the first chroma sampling format of the first image is a 4:4:4 chroma sampling format.

12. The method of claim 11, wherein an optimized value for a neighborhood size used in the edge preserving filtering is selected based at least in part on a guided image identified by the guided reference option in response to determining that the first chroma sampling format of the first image is a 4:2:2 chroma sampling format.

13. The method of claim 12, wherein an optimized value for a neighborhood size used in the edge preserving filtering is selected as a specific fixed value in response to determining that the first chroma sampling format of the first image is a 4:2:0 chroma sampling format.

14. A method comprising:
receiving an image data container containing a first image of a first luminance dynamic range and a second image of a second luminance dynamic range, the first and second image being derived from a same source image, the first luminance dynamic range being different from the second luminance dynamic range;
using image metadata in the image data container to determine whether edge preserving filtering is to be applied to generate chroma upsampled image data in a reconstructed image of the second luminance dynamic range from the second image of the second luminance dynamic range, the second image being represented in a second chroma sampling format less precise than a chroma sampling format of the source image;

in response to determining that edge preserving filtering is to be used to generate chroma image data in a reconstructed image of the second luminance dynamic range from the second image of the second luminance dynamic range, applying the edge preserving filtering to the second image based on the image metadata to generate the reconstructed image of the second luminance dynamic range;
rendering the reconstructed image on an image display to a viewer.

15. An apparatus comprising a processor and configured to perform the method recited in claim 14.

16. A non-transitory computer-readable storage medium having stored thereon computer-executable instruction for executing a method with one or more processors in accordance with the method recited in claim 14.

* * * * *